United States Patent
Mukherjee et al.

(10) Patent No.: US 7,400,611 B2
(45) Date of Patent: Jul. 15, 2008

(54) DISCOVERY OF BORDER GATEWAY PROTOCOL (BGP) MULTI-PROTOCOL LABEL SWITCHING (MPLS) VIRTUAL PRIVATE NETWORKS (VPNS)

(75) Inventors: Sarit Mukherjee, Morganville, NJ (US); Tejas Naik, Edison, NJ (US); Sampath Rangarajan, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 779 days.

(21) Appl. No.: 10/880,753

(22) Filed: Jun. 30, 2004

(65) Prior Publication Data

US 2006/0002401 A1   Jan. 5, 2006

(51) Int. Cl.
*H04Q 7/24* (2006.01)
*H04L 12/28* (2006.01)
(52) U.S. Cl. .................. 370/338; 370/392; 370/395.53
(58) Field of Classification Search ............ 370/395.53, 370/252; 379/221.15
See application file for complete search history.

(56) References Cited

U.S. PATENT DOCUMENTS

| | | | |
|---|---|---|---|
| 2002/0191541 A1* | 12/2002 | Buchanan et al. | 370/230 |
| 2003/0223406 A1* | 12/2003 | Balay et al. | 370/352 |
| 2004/0059831 A1* | 3/2004 | Chu et al. | 709/242 |
| 2004/0177157 A1* | 9/2004 | Mistry et al. | 709/241 |
| 2004/0255028 A1* | 12/2004 | Chu et al. | 709/227 |
| 2005/0025069 A1* | 2/2005 | Aysan | 370/254 |
| 2005/0066036 A1* | 3/2005 | Gilmartin | 709/226 |
| 2005/0083955 A1* | 4/2005 | Guichard et al. | 370/409 |
| 2005/0188106 A1* | 8/2005 | Pirbhai et al. | 709/238 |
| 2006/0002401 A1* | 1/2006 | Mukherjee et al. | 370/401 |
| 2006/0013209 A1* | 1/2006 | Somasundaram | 370/389 |
| 2006/0182037 A1* | 8/2006 | Chen et al. | 370/252 |

* cited by examiner

*Primary Examiner*—Hassan Kizou
*Assistant Examiner*—Brandon Renner

(57) ABSTRACT

A method and apparatus for identifying virtual private networks (VPNs) in a network of a service provider. The method and apparatus includes generating a VPN routing forwarding—route target (VRF-RT) table for the network. From the VRF-RT table, at least one of a VRF-VRF table and a VRF connectivity graph is generated. From the VRF-RT table, a set of atomic full-mesh components are identified, and from the at least one of a VRF-VRF table and a VRF connectivity graph, at least one set of other types of VPN components are identified, such as atomic single hub-and-spoke components, molecular multi-hub-and-spoke components, composite full-mesh components, composite single hub-and-spoke components, and/or composite multi hub-and-spoke components.

30 Claims, 15 Drawing Sheets

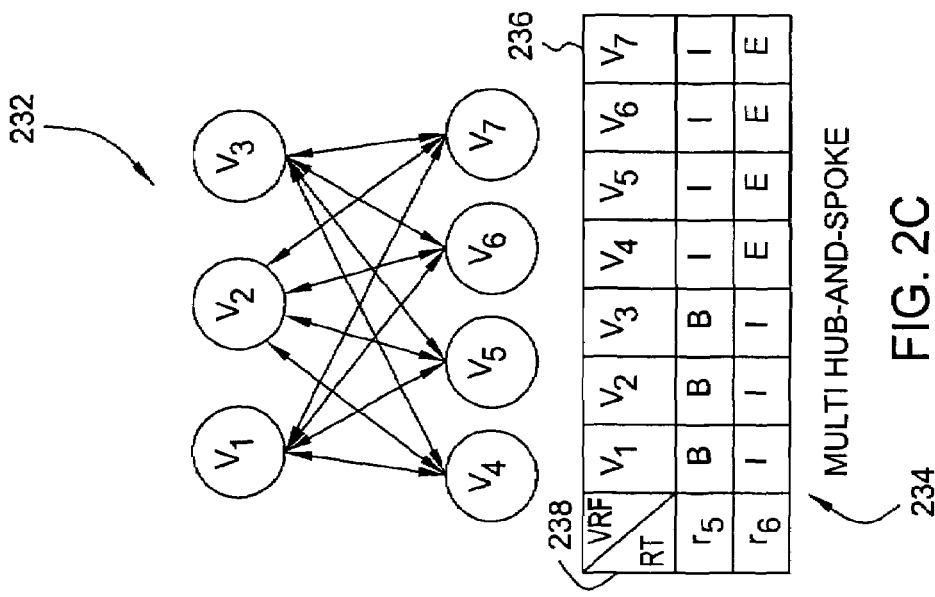
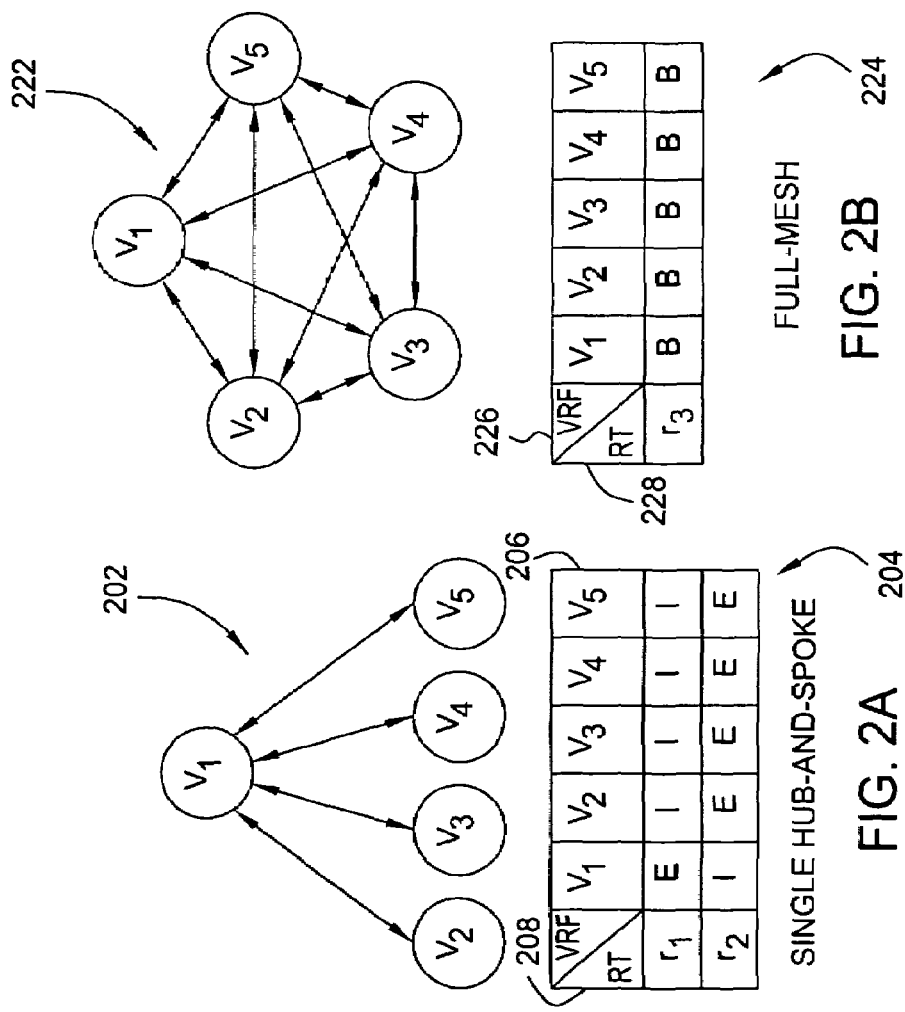
FIG. 2C MULTI HUB-AND-SPOKE
FIG. 2B FULL-MESH
FIG. 2A SINGLE HUB-AND-SPOKE

VRF-RT TABLE

| VRF / RT | $V_1$ | $V_2$ | $V_3$ | $V_4$ | $V_5$ | $V_6$ | $V_7$ | $V_8$ | $V_9$ | $V_{10}$ |
|---|---|---|---|---|---|---|---|---|---|---|
| $r_1$ | B | B | I | I | I | I | | | | |
| $r_2$ | | | | | B | B | B | B | | |
| $r_3$ | | I | B | | | E | | | | |
| $r_4$ | I | I | | E | E | | | | | |
| $r_5$ | | | | | | | | E | I | I |
| $r_6$ | | | | | | | | B | I | I | I |
| $r_7$ | | | | | | | | I | | E | E |
| $r_8$ | E | B | B | | | | | | | |

400

500

———— $r_1$    — — — $r_3$    ═══ $r_5$    — · — · $r_7$
═══ $r_2$    ≡≡≡ $r_4$    ·········· $r_6$    — ·· — ·· $r_8$

ADJACENCY MATRIX: (IMPORT)

| VRF\VRF | $V_1$ | $V_2$ | $V_3$ | $V_4$ | $V_5$ | $V_6$ | $V_7$ | $V_8$ | $V_9$ | $V_{10}$ |
|---|---|---|---|---|---|---|---|---|---|---|
| $V_1$ |  | $r_1,r_8$ | $r_1,r_8$ | $r_1$ | $r_1$ | $r_1$ |  |  |  |  |
| $V_2$ | $r_1$ |  | $r_1,r_8$ | $r_1$ | $r_1$ | $r_1$ |  |  |  |  |
| $V_3$ |  | $r_3,r_8$ |  |  |  |  |  |  |  |  |
| $V_4$ | $r_4$ | $r_4$ |  |  |  |  |  |  |  |  |
| $V_5$ | $r_4$ | $r_4$ |  |  |  | $r_2$ | $r_2$ | $r_2$ |  |  |
| $V_6$ |  | $r_3$ | $r_3$ |  | $r_2$ |  | $r_2$ | $r_2$ |  |  |
| $V_7$ |  |  |  |  | $r_2$ | $r_2$ |  | $r_2,r_6$ | $r_2,r_6$ | $r_2,r_6$ |
| $V_8$ |  |  |  |  | $r_2$ | $r_2$ | $r_2$ |  |  |  |
| $V_9$ |  |  |  |  |  |  | $r_7$ |  |  |  |
| $V_{10}$ |  |  |  |  |  |  | $r_7$ |  |  |  |

(EXPORT)

FIG. 6

UNIDIRECTIONAL LINKS     (IMPORT)

(EXPORT)

| VRF\VRF | $V_1$ | $V_2$ | $V_3$ | $V_4$ | $V_5$ | $V_6$ | $V_7$ | $V_8$ | $V_9$ | $V_{10}$ |
|---|---|---|---|---|---|---|---|---|---|---|
| $V_1$ |  | $r_1,r_8$ | ▨ | $r_1$ | $r_1$ | ▨ |  |  |  |  |
| $V_2$ | $r_1$ |  | $r_1,r_8$ | $r_1$ | $r_1$ | $r_1$ |  |  |  |  |
| $V_3$ |  | $r_3,r_8$ |  |  |  |  |  |  |  |  |
| $V_4$ | $r_4$ | $r_4$ |  |  |  |  |  |  |  |  |
| $V_5$ | $r_4$ | $r_4$ |  |  |  | $r_2$ | $r_2$ | $r_2$ |  |  |
| $V_6$ |  | $r_3$ | ▨ |  | $r_2$ |  | $r_2$ | $r_2$ |  |  |
| $V_7$ |  |  |  |  | $r_2$ | $r_2$ |  | $r_2,r_6$ | $r_2,r_6$ | $r_2,r_6$ |
| $V_8$ |  |  |  |  | $r_2$ | $r_2$ | $r_2$ |  |  |  |
| $V_9$ |  |  |  |  |  |  | $r_7$ |  |  |  |
| $V_{10}$ |  |  |  |  |  |  | $r_7$ |  |  |  |

600

800

———— $r_1$    - - - - - - $r_3$    ======== $r_5$    — - — - — $r_7$

═══════ $r_2$    ≡≡≡≡≡≡≡ $r_4$    ·············· $r_6$    — ·· — ·· — $r_8$

REDUCE SET OF RTs       (IMPORT)

| VRF\VRF | $V_1$ | $V_2$ | $V_3$ | $V_4$ | $V_5$ | $V_6$ | $V_7$ | $V_8$ | $V_9$ | $V_{10}$ |
|---|---|---|---|---|---|---|---|---|---|---|
| $V_1$ |  | $r_1$ | ▨ | $r_1$ | $r_1$ | ▨ |  |  |  |  |
| $V_2$ | $r_1$ |  | $r_1$ | $r_1$ | $r_1$ | $r_1$ |  |  |  |  |
| $V_3$ |  | $r_3$ |  |  |  |  |  |  |  |  |
| $V_4$ | $r_4$ | $r_4$ |  |  |  |  |  |  |  |  |
| $V_5$ | $r_4$ | $r_4$ |  |  |  | $r_2$ | $r_2$ | $r_2$ |  |  |
| $V_6$ |  | $r_3$ | ▨ |  | $r_2$ |  | $r_2$ | $r_2$ |  |  |
| $V_7$ |  |  |  |  | $r_2$ | $r_2$ |  | $r_2$ | $r_5$ | $r_5$ |
| $V_8$ |  |  |  |  | $r_2$ | $r_2$ | $r_2$ |  |  |  |
| $V_9$ |  |  |  |  |  |  | $r_7$ |  |  |  |
| $V_{10}$ |  |  |  |  |  |  | $r_7$ |  |  |  |

(EXPORT)

SET OF ATOMIC FULL-MESH COMPONENTS
(IMPORT)

ATOMIC ($V_1 \rightarrow V_4, V_5$)   (IMPORT)

ATOMIC ($V_2 \rightarrow V_3, V_6$)   (IMPORT)

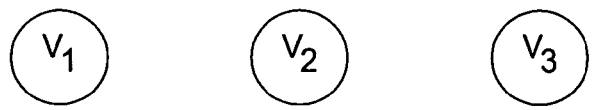
FIG. 16

DISCOVERY OF BORDER GATEWAY PROTOCOL (BGP) MULTI-PROTOCOL LABEL SWITCHING (MPLS) VIRTUAL PRIVATE NETWORKS (VPNS)

FIELD OF INVENTION

The present invention relates to Border Gateway Protocol-Multi-Protocol Label Switching virtual private networks (BGP-MPLS VPNs). More specifically, the present invention relates to a method for determining the number of VPNs that are hosted by a service provider and their respective topologies.

DESCRIPTION OF THE BACKGROUND ART

Border Gateway Protocol-Multi-Protocol Label Switching virtual private networks (BGP/MPLS VPN) is a mechanism that is defined under Request for Comment 2547 (RFC 2547), which allows service providers to use their IP backbone to provide VPN services for their customers. This mechanism is based on using BGP to distribute VPN routing information to the routers in the backbone network, and using MPLS to forward VPN traffic. MPLS tunnels are created dynamically when needed, which relieves service providers of pre-provisioning large numbers (e.g., thousands) of tunnels. BGP/MPLS VPNs allow service providers to define any arbitrary topology with any number of nodes in a VPN. The service provider can create multiple VPNs using the same core network.

A service provider typically supports numerous customer VPN's across its network. The service provider needs to know how many VPNs are in the network, as well as their topology, in order to efficiently manage the network resources, illustratively, when changes (additions or deletions) to the VPNs are required. For example, service provider customers may have a partial mesh topology, and wish to implement a full mesh topology. Thus, additional resources are required to fulfill such customer need.

Current VPN discovery tools look for various predetermined patterns in a network based on route targets (RT). Route targets define which nodes (e.g., routers) are exported and imported by a provider edge (PE) router, and hence, dictate the topology of a VPN. If a predetermined pattern is found, then a VPN of a particular topology can be said to have been identified in the network. However, the current VPN discovery tools do not accurately determine the total number of VPNs in the network. For example, there may be overlapping VPNs at a node that may not get counted, or a VPN pattern may not have been examined. Therefore, there is a need in the art for a method and apparatus for determining the number of VPNs that are hosted by a service provider and their respective topologies.

SUMMARY OF THE INVENTION

The disadvantages heretofore associated with the prior art are overcome by a novel method and apparatus for identifying virtual private networks (VPNs) in a network of a service provider. The method and apparatus includes generating a VPN routing forwarding—route target (VRF-RT) table for the network, and from the VRF-RT table, generating at least one of a VRF-VRF table and a VRF connectivity graph.

From the VRF-RT table, a set of atomic full-mesh components are identified, and from the at least one of a VRF-VRF table and a VRF connectivity graph, at least one set of other types of VPN components are identified. The other types of VPN components may include atomic single hub-and-spoke components, molecular multi-hub-and-spoke components, composite full-mesh components, composite single hub-and-spoke components, and composite multi hub-and-spoke components. The VPN network may be further defined as including at least one complex VPN, in an instance where one or more composite components are identified.

BRIEF DESCRIPTION OF THE DRAWINGS

The teachings of the present invention can be readily understood by considering the following detailed description in conjunction with the accompanying drawings, in which:

FIGS. 2A through 2C depict schematic diagrams of exemplary VPN topologies suitable for use in the present invention;

FIG. 6 depicts a VRF-VRF table of the present invention;

FIG. 9 depicts the VRF-VRF table of FIG. 7 having links associated with redundant RTs removed;

FIGS. 14-16 each depict the VRF-VRF table and associated schematic diagram of the nodes and associated links of the network after an exemplary iteration of the method of FIG. 13;

To facilitate understanding, identical reference numerals have been used, where possible, to designate identical elements that are common to the figures.

DETAILED DESCRIPTION OF THE INVENTION

The present invention provides a method for discovering virtual private networks (VPNs) and their associated topologies of a service provider (SP). The VPNs of the present invention are discussed in the context of Internet packet (IP) VPNs as defined by RFC 2547 within a router. RFC 2547 provides a method by which a Service Provider with an IP backbone may provide VPNs (Virtual Private Networks) for its customers. MPLS (Multiprotocol Label Switching) is used for forwarding packets over the backbone, and BGP (Border Gateway Protocol) is used for distributing routes over the backbone. The RFC 2547 and 2547bis ($2^{nd}$ version) documents are hereby incorporated by reference herein in their entireties.

Figure 1:
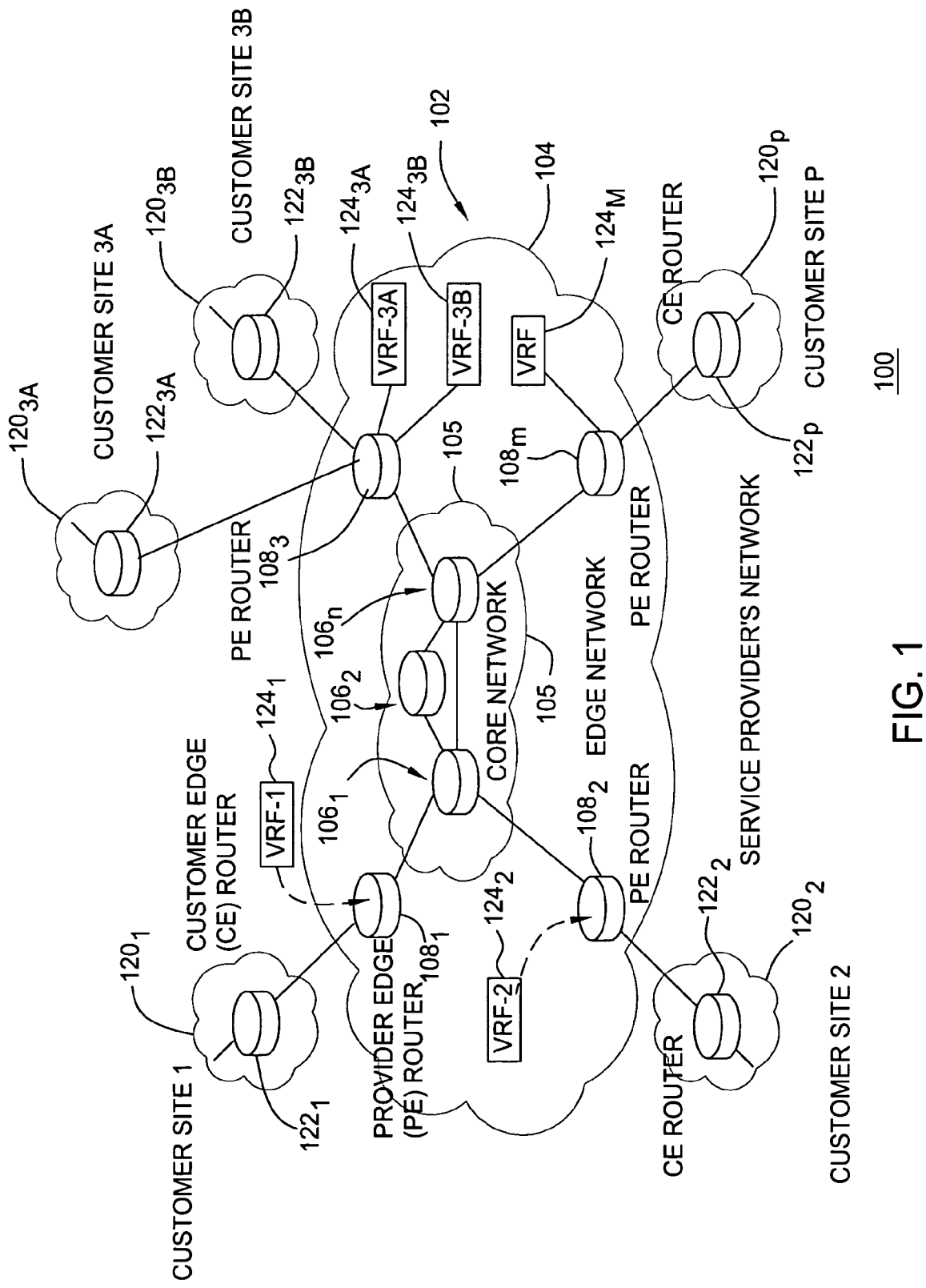
FIG. 1 depicts a high-level block diagram of an exemplary virtual private network (VPN) network suitable for implementing the present invention.

FIG. 1 depicts a high-level block diagram of an exemplary network 100 suitable for implementing the present invention. The network 100 comprises a service provider network 102 and a plurality of customer sites (networks) $120_1$ through $120_p$ (collectively customer networks 120). The service provider network 102 comprises a core network 105 formed by a plurality of core routers and switches $106_1$ through $106_n$ (collectively core routers 106), and an edge network 104 formed by a plurality of "provider edge" (PE) routers $108_1$ through $108_m$ (collectively PE routers 108). The PE routers 108 are connected to the core routers 106.

The backbone (i.e., core network and PE routers) is typically owned and operated by one or more Service Providers (SPs), and the owners of the sites are typically the "customers" of the SPs. The core network 105 may be a public network, such as the Internet, while the customers may be corporate or enterprise entities having a multitude of end users at various sites 120 utilizing the VPN-IP network 102.

The customer networks (sites) $120_1$ through $120_p$ may be intranet and/or extranet types of networks. It is noted that subscripts "m", "n", and "p" are integers greater than one. If a particular site 120 has a single host, that host may be the CE device. If a particular site has a single subnet, the CE device may be a switch. Typically, the CE device 122 is a router, which is commonly termed a CE router. A CE device 122 is always regarded as being in a single logical site 120 (although a physical customer site may consist of multiple "virtual logical sites"). However, a site 120 may belong to multiple VPNs.

Within the context of RFC 2547, a customer site 120 (or more specifically a CE router 122) is connected to the service provider network 102 (or more specifically, an edge router 108 on the provider's edge network 104) by one or more ports. For example, in FIG. 1 the CE router $122_1$ is connected to the PE router $108_1$ through one port, CE router $122_2$ is connected to PE router $108_2$ through a different port, and so forth. Thus, multiple CEs 122 may be connected to the same PE 108.

BGP/MPLS VPN is a mechanism that is defined in RFC 2547 that allows service providers to use their IP backbone to provide VPN services. This mechanism is based on using BGP to distribute VPN routing information to the routers 106 in the backbone network 105 and using MPLS to forward VPN traffic. MPLS tunnels are created dynamically when needed, which relieves service providers of pre-provisioning large numbers (e.g., thousands) of tunnels. BGP/MPLS VPNs allow service providers to define any arbitrary topology with any number of nodes in a VPN. The service provider can create multiple VPNs using the same core network 105.

CE and PE routers exchange routing information using static routing, RIPv2, OSPF or EBGP. A customer edge router 122 advertises the customer site's local VPN routes to the PE router 108, and learns remote VPN routes from the PE router. After learning local VPN routes from CE routers, a PE router exchanges this VPN routing information with other PE routers using IBGP. The service provider associates each of the incoming ports at a PE router to a VPN routing and forwarding (VRF) table 124. This table contains VPN routing information exchanged by the PE router with the CE router connected to that port. In FIG. 1, exemplary PE-3 $108_3$ requires two VRF tables that contain VPN routing and forwarding information. In particular, VRF-3A $124_{3A}$ contains VPN routing and forwarding information exchanged with CE-3A $122_{3A}$. Similarly, VRF-3B $124_{3B}$ contains information exchanged with CE-3B $108_{3B}$. Accordingly, FIG. 1 shows VRF tables $124_1$ through $124_m$ associated with each PE router 108 having connectivity with at least one CE router 122.

A BGP extended community attribute commonly known as a Route Target (RT) attribute identifies a collection of VRFs 124 to which a PE router 108 distributes routes. A PE router 108 uses this attribute to export local routes to other VRFs and to constrain the import of remote routes into its own VRFs. For example, in FIG. 1, assume that VRF-1 $124_1$ exports a route target and VRF-2 $124_2$ on PE-2 $108_2$ imports this route target. This means, the CE-2 router $122_2$ corresponding to VRF-2 $124_2$ knows how to reach hosts behind the CE-1 router $122_1$ corresponding to VRF-1 $124_1$. In order for CE-1 $124_1$ to reach hosts behind CE-2 $122_2$, VRF-2 $124_2$ needs to export a RT and VRF-1 $124_1$ needs to import this RT as well. Once this is done, bi-directional traffic can flow between hosts behind CE-1 $122_1$ and hosts behind CE-2 $122_2$.

This means, a bi-directional VPN link is established between VRF-1 $124_1$ and VRF-2 $124_2$. Thus, the VRFs together with the RTs define the topology of VPNs. Furthermore, any reference of traffic flow between VRFs refers to traffic flow between the CEs 122 connected to the ports on the PE routers 108 on which these VRFs 124 are defined.

FIGS. 2A-2C depict schematic diagrams of exemplary VPN topologies suitable for use in the present invention. As discussed above, a VPN topology can be provisioned using RTs, and the export and import of these RTs by the VRFs 124 determine the VPN topologies that can be provisioned.

FIG. 2A shows a single-hub-and-spoke topology 202, where VRF $v_1$ is the hub and VRFs $v_2$, $v_3$, $v_4$ and $v_5$ are spokes. In this topology, a single hub VRF can send and receive VPN traffic to a set of spoke VRFs 124, which are not capable of exchanging VPN traffic with each other. The VRF/RT table 204 below the schematic diagram comprises a top header row 206 listing the VRF tables associated with each node, and a leftmost header column 208 listing the RTs associated with each node. The VRF-RT tables 204, 224, and 234 are used to represent the export-import relationship between VRFs and RTs. An "E" entry in a cell of the table denotes that the RT is being exported by the VRF. Similarly, an "I" entry denotes an RT being imported. An entry of "B" denotes that the RT is being both imported and exported by the VRF.

Since node $v_1$ exports ("E") RT $r_1$ and nodes $v_2$-$v_5$ import ("I") RT $r_1$, nodes $v_2$-$v_5$ are able to receive data from node $v_1$. Further, since nodes $v_2$-$v_5$ export RT $r_2$ and node $v_1$ imports RT $r_2$, node $v_1$ is able to receive data from nodes $v_2$-$v_5$. Therefore, the double arrow formed between node $v_1$ and each of nodes $v_2$-$v_5$ exhibits the bi-directional communications between these nodes. It is noted that since nodes $v_2$-$v_5$ only export RT $r_2$ and import RT $r_1$, these nodes $v_2$-$v_5$ cannot communicate with each other, and therefore form the spokes associated with hub node $v_1$.

FIG. 2B shows a full-mesh topology 222, where a set of VRFs (e.g., $v_2$, $v_3$, $v_4$, and $v_5$) can exchange VPN traffic with each other. That is, the VRFs are completely connected. The VRF/RT table 224 below the schematic diagram comprises a header row 226 listing the VRF tables associated with each node, and a header column 228 listing the RTs associated with each node. The RT $r_3$ for each node $v_1$-$v_5$ is the same. That is, nodes $v_1$-$v_5$ export and import the same RT (e.g., $r_3$). Since the RT $r_3$ is the same for both ("B") importing and exporting data between each node, a full mesh topology is formed.

FIG. 2C shows a multi-hub-and-spoke, where a set of hub VRFs $v_1$, $v_2$, and $v_3$ collectively form a full-mesh and can exchange VPN traffic among each other, as well as exchange VPN traffic with a set of spoke VRFs $v_4$, $v_5$, $v_6$, and $v_7$. The spoke VRFs in FIG. 2C cannot exchange VPN traffic with each other. The VRF/RT table 234 below the schematic diagram comprises a header row 236 listing the VRF tables associated with each node, and a header column 238 listing the RTs associated with each node. Two RT's $r_5$ and $r_6$ are illustratively used to form the multi-hub-and-spoke topology depicted in FIG. 2C. In particular, nodes $v_1$-$v_3$ both import and export $r_5$, thereby forming a full mesh between nodes $v_1$-$v_3$. Further, nodes $v_1$-$v_3$ import RT $r_6$ and nodes $v_4$-$v_7$ import RT $r_5$ and export RT $r_6$. Thus, nodes $v_1$-$v_3$ also function as hubs for spoke nodes $v_4$-$v_7$.

When the VRFs are provisioned, they are typically provisioned using a minimum number of RTs. For example, as shown in FIGS. 2B and 2C, to provision a full-mesh, only one RT is needed. As long as a single RT is defined in all the VRFs and is exported and imported by all the VRFs, VPN connectivity is established between every pair of VRFs, thus leading to a full-mesh topology. Similarly, to provision a single-hub-and-spoke (FIG. 2A) or a multi-hub-and-spoke (FIG. 2C) only two RTs are needed. One RT will be exported by the (multi) hub, which will be imported by all the spokes, while all the spokes will import a single RT, which will be imported by the (multi) hub. The largest of such components provisioned using the minimum number of RTs are referred to as "atomic" and "molecular" components as defined below.

In particular, an "atomic component" is defined as the largest single hub-and-spoke with two RTs, and the largest full-mesh with one RT. FIGS. 2A and 2B are examples of atomic components. A "molecular component" is defined as the largest multi hub-and-spoke with two RTs without any restriction on overlapping links and nodes with atomic components. FIG. 2C is an example of molecular component. It is noted that the exemplary topology of FIG. 2C is composed of four atomic components, which include one full-mesh and three single hub-and-spokes. In particular, nodes ($v_1$, $v_2$, $v_3$) form the full-mesh, and nodes ($v_1$, $v_4$-$v_7$), ($V_2$, $v_4$-$v_7$), and ($v_3$, $v_4$-$v_7$) form the single hub-and-spokes.

An important problem to be solved is the discovery of different components that a VPN is comprised of (that is, the topology of the VPN in terms of its different components). In addition to discovering atomic and molecular components, which are provisioned using minimum number of RTs, it is desirable to discover basic components such as full-mesh, single-hub-and-spoke and multi-hub-and-spoke even if they are provisioned using more than the minimum number of RTs. In this regard, two other types of components are defined.

In particular, a "composite component" is defined as the largest single hub-and-spoke or the largest full-mesh or the largest multi hub-and-spoke components without any restriction on the number of RTs. Therefore, by definition all atomic and molecular components are composite VPNs. A "complex VPN" is defined as one or more composite components.

As discussed below in further detail regarding the discovery method of the present invention, all the atomic components are first identified, and then molecular components are constructed from the atomic components, if any. Once the atomic and molecular components are determined, composite components are determined, which are subsequently used to determine complex VPNs in the network. It is noted that composite components may be determined without determining the atomic or molecular components.

Figure 3:
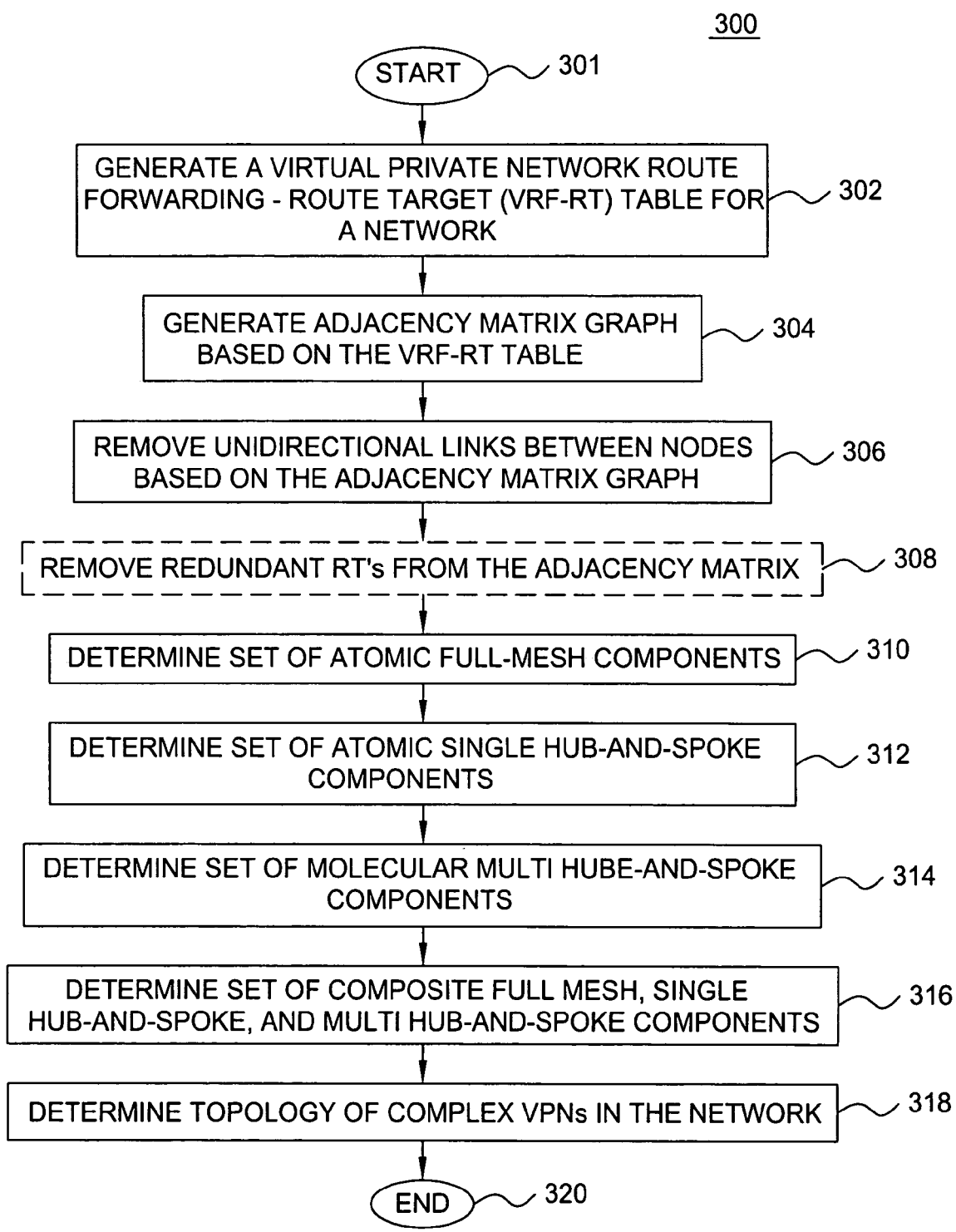
FIG. 3 depicts a flow diagram of a method for determining VPN topology in a network.

FIG. 3 depicts a flow diagram of a method 300 for determining VPN topology in a network 100. For purposes of implementing method 300, it is assumed that route distribution is provided by BGP/MPLS VPN, and is not affected by route redistribution, filtering, route maps, or any other external mechanisms on the PE or CE routers.

Given a description of a VPN (using RTs), the VPN can be decomposed into different sets of components. For purposes of clarity, notation $(f_1, f_2, \ldots, f_x)$ is used to denote a full-mesh created using nodes $f_i$, $i=1, \ldots, x$. Notation $(h \rightarrow s_1, s_2, \ldots, s_x)$ is used to denote a single hub-and-spoke, where h represents the hub and $s_i$, $i=1, \ldots, x$ represents the spokes. Similarly notation $(h_1, h_2, \ldots, h_y \rightarrow s_1, s_2, \ldots, s_x)$ is used to denote a multi hub-and-spoke, where $h_i$, $i=1, \ldots, y$ represents the hubs and $s_i$, $i=1, \ldots, x$ represents the spokes. It is noted that $(h_1, h_2, \ldots, h_y)$ represents a full-mesh.

Figures 4, 5:
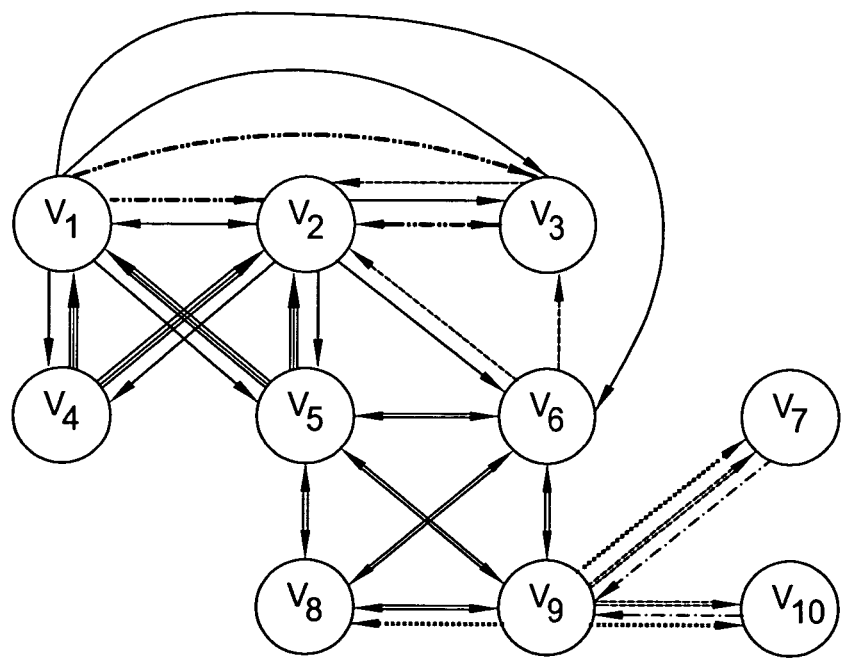
FIG. 4 depicts a VPN Route Forwarding—Route Target (VRF-RT) table according to the principles of the present invention.
FIG. 5 depicts a schematic diagram of nodes and associated links of the network as defined by the VRF-RT table of FIG. 4.

The method 300 starts at step 301 and proceeds to step 302, where a virtual private network route forwarding—route target (VRF-RT) table is generated for a network of a service provider. FIG. 4 depicts a VRF-RT table 400 according to the principles of the present invention. FIG. 5 depicts a schematic diagram 500 of nodes and associated links of the network as defined by the VRF-RT table 400 of FIG. 4. FIGS. 4 and 5 should be viewed in conjunction with method 300 of FIG. 3.

Referring to FIG. 4, for a given network 100, let the number of VRFs be n, and the number of unique RTs be m. The VRFs are numbered as $v_1, v_2, \ldots, v_n$, and form the columns of table 400. The RTs are numbered as $r_1, r_2, \ldots, r_m$, and form the rows of table 400 Table 400 is formed by m×n matrix, referred to VR matrix, where RT $r_k$, $1 \leq k \leq m$ forms the $k^{th}$ row, and VRF $v_i$, $1 \leq i \leq n$ forms the $i^{th}$ column of the table. The VR table is populated with entries including "E", "I" or "B", where B, E, and I respectively represent export, import, or both, in accordance with the specified RTs. For example, ten nodes $v_1$-$v_{10}$ are illustratively labeled in the header of each column, and eight RT values are labeled in the header of each row of the graph 600. It is noted that a row may be removed from the VRF-RT table 400 if the row has only one B entry, all E entries, or all I entries associated with each node thereacross. Specifically, each VRF must be able to reach (export and/or import) with at least one other VRF.

In the exemplary VRF-RT table 400 of FIG. 4, the following entries are provided. RTs $r_1$ is denoted B in nodes $v_1$-$v_2$, and I in nodes $v_3$-$v_6$; $r_2$ is denoted B in nodes $v_5$-$v_8$; $r_3$ is denoted I in node $v_2$, B in node $v_3$, and E in node $v_6$; $r_4$ is denoted I in nodes $v_1$-$v_2$, and B in nodes $v_4$-$v_5$; $r_5$ is denoted E in node $v_7$, and I in nodes $v_9$-$v_{10}$; $r_6$ is denoted B in node $v_7$, and I in nodes $v_8$-$v_{10}$; $r_7$ is denoted I in node $v_7$, and E in nodes $v_9$-$v_{10}$; and $r_8$ is denoted E in node $v_1$, and B in nodes $v_2$-$v_3$. It is noted that the subsequent exemplary FIGS. 5-12 and 14-16 may be derived from the exemplary VRF-RT table 400 of FIG. 4.

Referring to FIG. 4 nodes $v_1$ and $v_2$ illustratively have B entries for RT $r_1$. Accordingly, referring to FIG. 5, nodes $v_1$-$v_{10}$ are shown with their associated links therebetween according to the VRF-RT table of FIG. 4. For example, a double headed arrow link associated with $r_1$ is formed between nodes $v_1$ and $v_2$ (B entries). Additionally, node $v_1$ imports $r_4$, while node $v_4$ exports $r_4$. Thus, a unidirectional arrow associated with $r_1$ is formed from $v_4$ to $v_1$, as shown in FIG. 5. Similarly, node $v_9$ exports $r_7$ and node $v_7$ imports $r_7$, so a unidirectional arrow associated with $r_7$ is shown extending from $v_9$ to $v_7$ in FIG. 5, and so forth. For purposes of understanding the invention, each link associated with a particular RT is drawn differently in FIG. 5. For example, links between nodes associated with $r_1$ are illustratively drawn with solid lines, while links between nodes associated with $r_3$ are illustratively drawn with dashed lines, and so forth. Such link representations are for illustrative purposes only. Once the VRF-RT table is completed, the method 300 then proceeds to step 304.

At step 304, a VRF-VRF table (i.e., an adjacency matrix (AM)) 600 is generated based on the VRF-RT table. FIG. 6 depicts an VRF-VRF table 600 of the present invention. FIG. 6 should be viewed in conjunction with FIGS. 3-5. The VRFs associated with the rows and columns are the nodes of the VRF-VRF table 600. The AM 600 is formed by putting a directed edge with label $r_k$ from node $v_i$ to node $v_j$, $i \neq j$, if RT $r_k$ from VRF-RT table is exported by node $v_i$ and imported by node $v_j$. Let the edge be represented by $(v_i, v_j)r_k$. The B entries are treated as both E and I entries. In the exemplary VRF-VRF table representation of the graph 600, an n×n matrix is generated with $AM(v_i, v_j)=r_k$ if there is an RT $r_k$, $1 \leq k \leq m$ in the VRF-RT table that is exported by node $v_i$ and imported by node $v_j$ and $i \neq j$; i, j=1, ..., n.

The VRF-VRF table 600 illustratively comprises ten nodes $v_1$-$v_{10}$ labeled in sequential order along the top header of each row, as well as the leftmost column of the AM 600. The nodes $v_1$-$v_{10}$ forming the columns are associated with imported RTs, while the nodes $v_1$-$v_{10}$ forming the rows are associated with exported RTs. Referring to FIG. 6, node $v_2$ (in row 2) exports $r_1$ to nodes $v_1$ and nodes $v_3$-$v_6$. Node $v_2$ (in row 2) also exports $r_8$ to node $v_3$, as shown in FIG. 5. The entries in the VRF-VRF table 600 of FIG. 6 include the RT value associated with each node pair. It is noted that the diagonal entries along dotted line 608 of the matrix 600 are left empty, such that an upper triangular matrix 610 and lower triangular matrix 612 is formed on opposing sides of the empty diagonal entries 608. The entries pertaining to the export RTs for node $v_2$ are $r_1$, which is associated with nodes $v_1$ and nodes $v_3$-$v_6$, as well as $r_8$, which is associated with node $v_3$. Similarly, the VRF-VRF table 600 also shows that node $v_9$ illustratively imports RTs $r_5$ and $r_6$ from node $v_7$, and so forth. Once the VRF-VRF table 600 is completed, the method 300 proceeds to step 306.

At step 306, the VRF-VRF table 600 may be utilized to identify and remove unidirectional links between nodes. A link qualifies as being unidirectional, if the nodes it is directed between do not have another link going in the opposite direction. In the exemplary VRF-VRF table shown in FIG. 6, if $AM(v_i, v_j)$ exists, but $AM(v_j, v_i)$ does not, then $(v_i, v_j)$ is an unidirectional link, $i \neq j$; i, j=1, ..., n. For example, referring to FIGS. 5 and 6, the RTs between nodes $v_1$ and $v_3$ are $r_1$ and $r_8$. Both links are unidirectional, since there is no link going in the opposite direction. By comparison, two unidirectional links going in opposite directions and one bidirectional link illustratively exist between nodes $v_2$ and $v_3$. At step 306, all the unidirectional links are removed from the graph and put them in subset U, where $U=\{(v_i, v_j)r_k | AM(v_i, v_j)=r_k \wedge AM(v_j, v_i)=\Phi, i \neq j, 1 \leq i,j \leq n, 1 \leq k \leq m\}$.

Figures 7, 8:
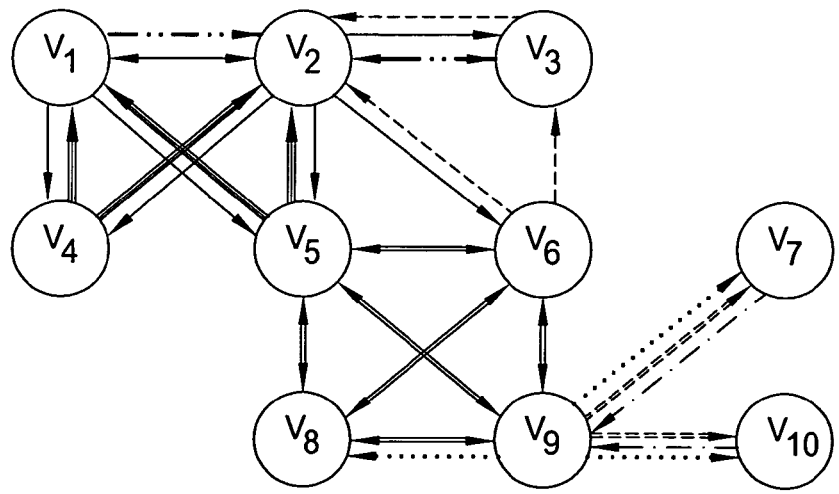
FIG. 7 depicts the VRF-VRF table of FIG. 6 having all unidirectional links removed.
FIG. 8 depicts a schematic diagram of the nodes and associated links of the network as defined by the VRF-VRF table of FIG. 7.

FIG. 7 depicts the VRF-VRF table 600 of FIG. 6 having all unidirectional links removed. FIG. 8 depicts a schematic diagram 800 of nodes and associated links of the network as defined by the VRF-VRF table 600 of FIG. 7. FIG. 7 is the same as FIG. 6, except that the exemplary RT entries associated with the unidirectional links between nodes $v_1$ and $v_3$, $v_6$ and $v_3$, and $v_1$ and $v_6$ have been removed. More specifically, FIG. 8 is the same as FIG. 5, except that the $r_1$ links between nodes $v_1$ and $v_3$, and $v_1$ and $v_6$ have been removed. Similarly, the $r_8$ link between nodes $v_3$ and $v_6$ has also been removed. Referring to the VRF-VRF table 600 of FIG. 7, $U=\{(v_1,v_3)r_1,r_8, (v_1,v_6)r_1, (v_6,v_3)r_3\}$. Once all the unidirectional links have been removed and the VRF-VRF table 600 is updated (i.e., shaded cells) to reflect these changes, the method 300 proceeds to optional step 308.

Figure 10:
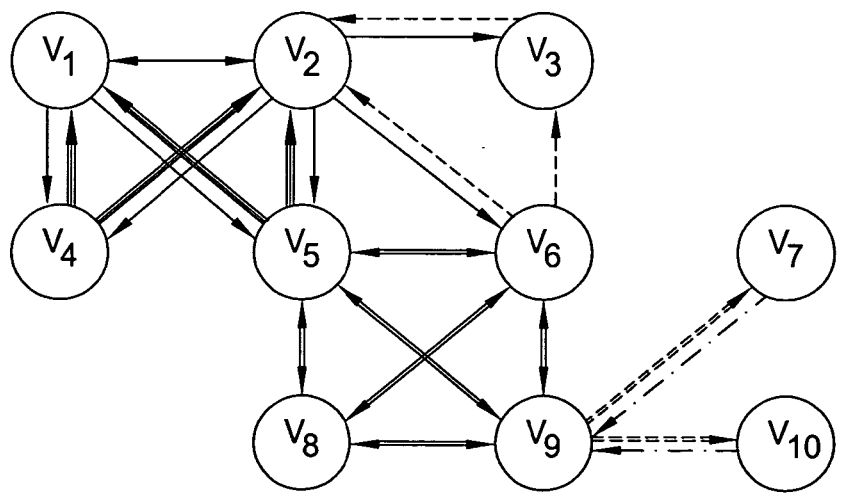
FIG. 10 depicts a schematic diagram of the nodes and associated links of the network as defined by the VRF-VRF table of FIG. 9.

At optional step 308, redundant RTs are removed from the VRF-VRF table 600. Specifically, step 308 is performed in an instance where redundant RTs exist in the VRF-VRF table. FIG. 9 depicts the VRF-VRF table 600 of FIG. 7 having redundant RT links removed. FIG. 10 depicts a schematic diagram 1000 of nodes and associated links of the network 100 as defined by the VRF-VRF table 600 of FIG. 9.

The optional RT reduction technique includes the following steps: 1) Denote by binary variable $x_{ri}$, $1 \leq i \leq m$, if RT $r_i$ is present in the set of minimal RTs; 2) Consider each cell in the VRF-VRF table. Let $(r_1, r_2, ..., r_p)$ represent the set of RTs in that cell. Introduce a constraint such as $x_{r1}+x_{r2}+...+x_{rp} \geq 1$; 3) Minimize $$\sum_{i=1}^{m}$$

$x_{ri}$ subject to the above set of constraints; and 4) Solve the minimization problem, where the solved for $x_{ri}$'s provide the minimal RT set.

It is noted that if some RT i is kept for some reason, then $x_i=1$ should be made in the constraint set. If preference on removal is given to of one RT over another, then the objective function can be changed to minimize $$\sum_{i=1}^{m}$$

$w_i \, x_{ri}$, where $w_i$ is a relative weight on the RT. If an RT is removed in preference of another, then the former should be given higher weight.

The rows containing only the redundant RTs are removed from the VRF-RT Table (not shown in the figures). Also, the redundant RTs, if any, are removed from the remaining cells in the VRF-VRF Table. Accordingly, the removal of redundant RTs may correspondingly be shown in the VRF-VRF table, as shown and discussed below with respect to FIG. 7.

For the rest of the method 300, it is assumed that the set of RTs has been reduced in accordance with step 308. The number of RTs may have been reduced, and the reduced number is still denoted by m. Further, for ease of description, there is no gap in the sequence of RTs once an RT is removed. For example, if there are 5 RTs RT1 through RT5, and RT3 is removed, then the four remaining RTs are denoted RT1-RT4. It is noted that the discovery method 300 is operable without the inclusion of the reduction step 308 of FIG. 3.

Referring to FIG. 7, redundant links are found between nodes $v_2$ and $v_1$, $v_2$ and $v_3$, and $v_7$ with nodes $v_8$-$v_{10}$, as shown by the dual RT entries in the cells associated with these nodes. For example, referring to the links between nodes $v_7$ and $v_8$-$v_{10}$, if $r_2$ is removed, then the links associated with nodes $v_5$-$v_8$ may be lost as well, which is undesirable. However, if link $r_6$ is removed between node $v_7$ and each of nodes $v_8$-$v_{10}$, then links $r_2$ and $r_5$ still remain to provide connectivity therebetween node $v_7$ and each of nodes $v_8$-$v_{10}$. In other words, removing redundant links between one pair of nodes should not destroy linkage capabilities between any other pair of nodes.

From the VRF-VRF table, the problem is formulated as Minimize $\Sigma_{i=1}^{8} x_i$, subject to $0 \leq x_i \leq 1$, $1 \leq i \leq 8$, and $x_1 \geq 1$, $x_2 \geq 1$, $x_3 \geq 1$, $x_4 \geq 1$, $x_7 \geq 1$, $x_1 + x_8 \geq 1$, $x_2 + x_6 \geq 1$, $x_3 + x_8 \geq 1$, $x_5 + x_6 \geq 1$. The solution to this problem is $x_1 = x_2 = x_3 = x_4 = x_7 = 1$, and either $x_5$ or $x_6$ is 1. The variable $x_5$ is randomly selected as equal to one ($x_5 = 1$). So the reduced set of RTs is $\{r_1, r_2, r_3, r_4, r_5, r_7\}$.

Referring to FIG. 7, if links associated with $r_1$ were removed when trying to choose between redundant RTs for nodes $v_2$ and $v_1$, the linkage between nodes $v_1$ and $v_4$-$v_5$, as well as between nodes $v_2$ and $v_4$-$v_6$ would be lost. Rather, redundant link $r_8$ may be removed, without sacrificing communication capabilities between the aforementioned nodes. Referring to FIG. 9, the $r_8$ entry is removed from the $v_2/v_1$ and $v_3/v_2$ cells. Similarly, $r_6$ has been removed from the $v_8$-$v_{10}/v_7$ cells. Therefore, $r_1$ remains in the $v_2/v_1$ and $v_3/v_2$ cells, $r_2$ remain in the $v_8/v_7$ cell, and $r_5$ remains in the $v_9/v_{10}$ cells. Referring to FIG. 10, FIG. 10 is the same as FIG. 8, except that the links associated with RTs $r_6$ and $r_8$ are removed from between their associated nodes (e.g., $v_1$ and $v_2$, $v_2$ and $v_3$, and $v_7$ and $v_8$-$v_{10}$). Once the removal of redundant RTs is performed (in optional step 308), the method 300 proceeds to step 310.

At step 310, a set (F) of atomic full-mesh components is determined. Recall that an atomic full-mesh component is defined as the largest full-mesh that is assigned one RT. If an RT in VRF-RT table has more than one B, then output the set of nodes with B's is a full-mesh, which are placed in subset F.

Figures 11, 12:
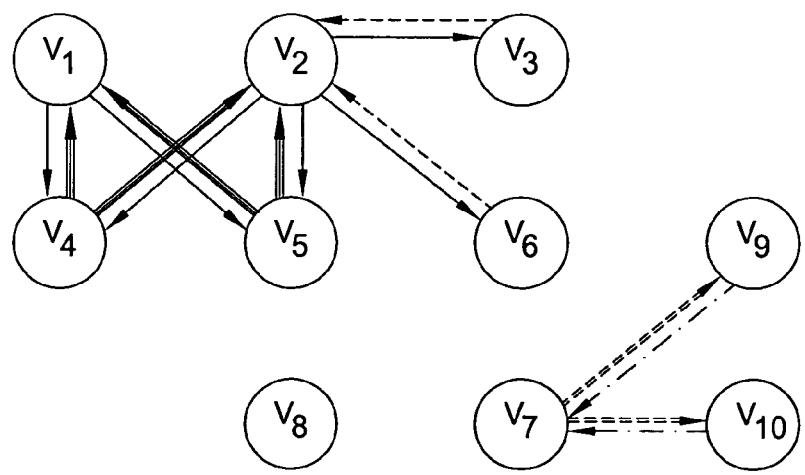
FIG. 11 depicts the VRF-VRF table of FIG. 9 having bidirectional links associated with atomic fill-mesh components removed.
FIG. 12 depicts a schematic diagram 1200 of the nodes and associated links of the network as defined by the VRF-VRF table of FIG. 11.

FIG. 11 depicts the VRF-VRF table 600 of FIG. 9 having bidirectional links associated with atomic full-mesh components removed. FIG. 12 depicts a schematic diagram of the nodes and associated links of the network as defined by the VRF-VRF table of FIG. 11. The B's are removed from the VRF-RT table 400 (not shown). Referring to FIG. 11, the effect of this is to remove all the corresponding bidirectional links in the graph, i.e., the entries in the adjacency matrix (AM), but not the nodes. We define $bk = \{v_i | VR(r_k, v_i) = B, 1 \leq i \leq n\}$, which is the set of all the VRFs that both import and export $r_k$ (i.e., B in the cell in the VRF-RT table for row $r_k$). Therefore, $F = \{b_k | |b_k| > 1, 1 \leq k \leq m\}$.

For example, in FIG. 11, the VRFs that both import and export rk that are removed are bidirectional links between $v_1/v_2$, $v_5/v_6$, $v_5/v_7$, $v_5/v_8$, $v_6/v_7$, $v_6/v_8$, and $v_7/v_8$. Since the AM 600 depicts cells representing the relationship of exporting and importing between the nodes, a total of 14 cells are removed, as represented by the checkered cells in FIG. 11. Thus, $F = \{(v_1, v_2), (v_5, v_6, v_7, v_8)\}$. FIG. 12 depicts the ten nodes $v_1$-$v_{10}$ with the remaining links after step 310 has been performed. It is noted that only paired unidirectional links remain between the nodes $v_1$-$v_{10}$, where the each of the unidirectional links in each pair point in opposite direction. The method 300 then proceeds to step 312.

At step 312, a graphical representation (i.e., VRF connectivity graph) of the VRF-VRF table may also be utilized to perform the remaining steps of FIG. 3. In particular, at step 312, a set of atomic single hub-and-spoke components is determined. Recall that a molecular component is the largest multi hub-and-spoke with two RTs, without any restriction on overlapping links and nodes with atomic components (e.g., FIG. 2C is an example of molecular component).

In order to discover all the atomic single hub-and-spoke components, step 312 begins by selecting a hub. A node whose out-degree is one or more qualifies for this. It is noted that since the unidirectional links are removed, in-degree and out-degree of a node are the same. The set is referred to as the set of candidate hubs, denoted by CH, where $CH = \{V_h | \exists i, k, \text{ such that } VR(v_h, v_i) = r_k, 1 \leq i \leq n \; 1 \leq k \leq m\}$.

The exemplary candidate hubs from the example shown beginning with FIG. 4 include the set $CH = \{v_1, v_2, v_3, v_4, v_5, v_6, v_7, v_9, v_{10}\}$.

A node in an atomic full-mesh component may become a hub in a molecular multi hub-and-spoke component. It can happen only if the RT used for determining the atomic full-mesh has an "I" in some of its entries. In order to facilitate the determination of molecular components, a set of preferred hubs, denoted as PH is prepared, where $$PH = \bigcup_{k=1}^{m} \{f_k \mid (f_k \in F) \wedge (\exists i \; VR(r_k, v_i) = I, 1 \leq i \leq n)\}.$$

Referring to FIG. 4, RT $r_1$ is used for determining an atomic full-mesh, since $r_1$ has an "I" entry in some of its entries associated with the nodes. Therefore, in the current example, the set of preferred hubs $PH = \{v_1, v_2\}$.

A determination is made for how many of the hubs of the candidate hubs CH become part of an atomic single hub-and-spoke. In order to qualify, there must be two distinct RTs, one where the candidate hub exports to a set of nodes, and the other where the candidate hub imports from the same set of nodes.

Figure 13:
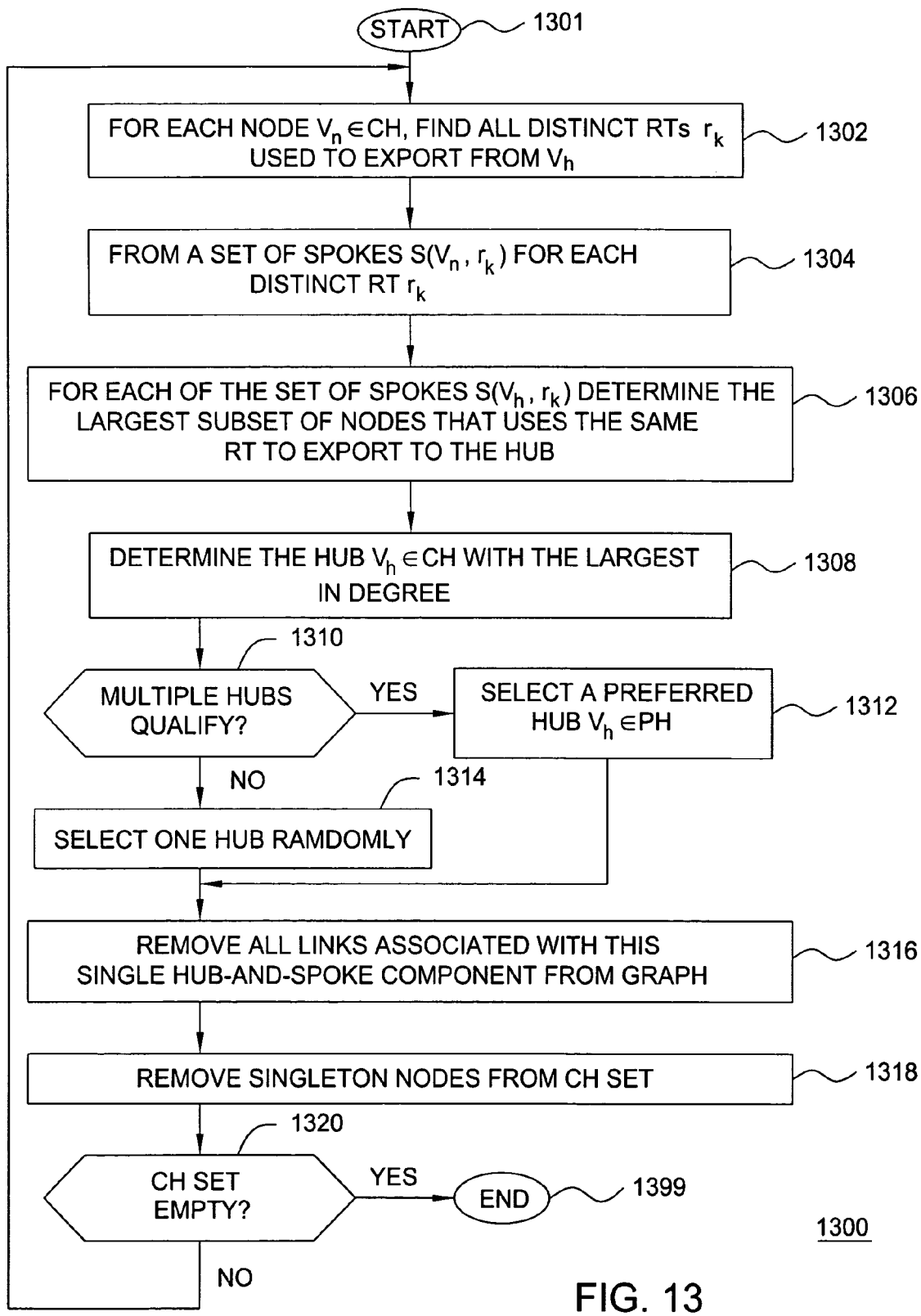
FIG. 13 depicts a flow diagram of an exemplary method for determining a set of atomic single hub-and-spoke components suitable for use in the method of FIG. 3.

FIG. 13 depicts a flow diagram of an exemplary method 1300 for determining a set of atomic single hub-and-spoke components suitable for use in the method 300 of FIG. 3. The method 1300 starts at step 1301, and proceeds to step 1302, where for each node $v_h \in CH$, all the distinct RTs $r_k$, $1 \leq k \leq m$, used to export from $v_h$ are identified. At step 1304, the set of spokes $S(v_h, r_k)$ for each distinct RT $r_k$ are formed, where $S(v_h, r_k) = \{s | VR(v_h, s) = r_k\}$.

At step 1306, for each of the set of spokes $S(v_h, r_k)$, $1 \leq k \leq m$, the largest subset of nodes that uses the same RT to export to the hub is determined. The cardinality of the largest subset is the in-degree of the hub, where $\text{In-Degree}(v_h) = \max_{1 \leq k \leq m} |\{s | VR(s, v_h) = r_j, s \in S(v_h, r_k), r_j \neq r_k, 1 \leq j, k \leq m\}|$.

At step 1308, the hub $v_h \in CH$ with the largest in-degree is identified. At step 1310, if multiple hubs qualify, then the method 1300 proceeds to step 1312, where a preferred hub $v_h \in PH$ is selected from the set of preferred hubs. That is, $(v_h \rightarrow \{s_i | VR(s_i, v_h) = r_j, s_i \in S(v_h, r_k), r_j \neq r_k, 1 \leq j, k \leq m\})$. This single hub-and-spoke $(v_h \rightarrow s_1, \ldots, s_x)$ is included in S. Therefore, $S = S \cup \{(v_h \rightarrow s_1, \ldots, s_x)\}$, and the method 1300 then proceeds to step 1316. Otherwise, if at step 1310 only a single hub qualifies, the method 1300 proceeds to step 1314, where a single hub is randomly selected.

At step 1316, all links associated with this single hub-and-spoke component $(v_h \rightarrow s_1, \ldots, s_x)$ are removed from the graph. That is, assign $AM(v_h, s_i) = AM(s_i, v_h) = \Phi$, where $\Phi$ represents a null set. At step 1318, the singleton nodes (i.e., nodes with no incoming and outgoing links) are removed from the set of candidate hubs CH, and the method 1300 proceeds to step 1320. It is noted that any remaining unidirectional links are also removed.

At step 1320, if the candidate hub set CH is empty, (i.e., all nodes have been removed, the method proceeds to step 1399, where the method 1300 ends. Otherwise, the method 1300 proceeds to 1301, where the method 1300 continues until at step 1320, the CH set is empty, and the method 1300 ends at step 1399.

TABLES 1-4 shown below correspond to the example provided thus far with respect to FIGS. 4-12, where several reiterations of method 1300 of FIG. 13 are applied. For each element of the candidate hub set, the set of spokes reachable using one RT is identified (steps 1302 and 1304). From the set of spokes, the subsets of nodes that use the same RT to export to the hub is determined (step 1306). The cardinality of the largest such subset is then computed (step 1308).

TABLE 1

| Spoke set | Elements | Export to hub | In-Degree |
|---|---|---|---|
| $S(v_1, r_1)$ | $\{v_4, v_5\}$ | $\{v_4, v_5\}$ to $v_1$ using $r_4$ | $\max\|\{v_4, v_5\}\| = 2$ |
| $S(v_2, r_1)$ | $\{v_3, v_4, v_5, v_6\}$ | $\{v_3, v_6\}$ to $v_2$ using $r_3$ and $\{v_4, v_5\}$ using $r_4$ | $\max\{\|\{v_3, v_6\}\|, \|\{v_4, v_5\}\|\} = 2$ |
| $S(v_3, r_3)$ | $\{v_2\}$ | $\{v_2\}$ to $v_3$ using $r_1$ | $\max\|\{v_2\}\| = 1$ |
| $S(v_4, r_4)$ | $\{v_1, v_2\}$ | $\{v_1, v_2\}$ to $v_4$ using $r_1$ | $\max\|\{v_1, v_2\}\| = 2$ |
| $S(v_5, r_4)$ | $\{v_1, v_2\}$ | $\{v_1, v_2\}$ to $v_5$ using $r_1$ | $\max\|\{v_1, v_2\}\| = 2$ |
| $S(v_6, r_3)$ | $\{v_2\}$ | $\{v_2\}$ to $v_6$ using $r_1$ | $\max\|\{v_2\}\| = 1$ |
| $S(v_7, r_5)$ | $\{v_9, v_{10}\}$ | $\{v_9, v_{10}\}$ to $v_7$ using $r_7$ | $\max\|\{v_9, v_{10}\}\| = 2$ |
| $S(v_9, r_7)$ | $\{v_7\}$ | $\{v_7\}$ to $v_9$ using $r_5$ | $\max\|\{v_7\}\| = 1$ |
| $S(v_{10}, r_7)$ | $\{v_7\}$ | $\{v_7\}$ to $v_{10}$ using $r_5$ | $\max\|\{v_7\}\| = 1$ |

Referring to FIG. 12, the spoke set includes nodes $v_1$-$v_7$ and $v_9$-$v_{10}$, since node $v_8$ is isolated (i.e., no export or import RT between $v_8$ and any other node). Node $v_1$ exports to nodes $v_4$ and $v_5$ via $r_1$, and nodes $v_4$, $v_5$ export to $v_1$ using $r_4$. Thus, the maximum in-degree value for spoke $v_1$ is 2 ($\max\|\{v_4, v_5\}\|=2$). Node $v_2$ exports to nodes $v_3$-$v_6$ via $r_1$. Nodes $v_3$ and $v_6$ export to $v_2$ using $r_3$, while nodes $v_4$ and $v_5$ export to $v_2$ using $r_4$. Thus, the maximum in-degree value for spoke $v_2$ is 2 ($\max\{\|\{v_3,v_6\}\|,\|\{v_4,v_5\}\|\}=2$). Similar analysis is made for the remaining spoke sets, as shown above in TABLE 1.

Referring to FIG. 13, at step 1308, the hubs qualified for selection are $v_1, v_2, v_4, v_5, v_7$, since they all have the highest in-degree value=2. At step 1312, single hub-and spoke component ($v_1 \rightarrow v_4, v_5$) is selected, since node $v_1$ belongs to the preferred hub set ($v_1 \in$ PH). Specifically, in the current example, the set of preferred hubs PH=$\{v_1, v_2\}$. Therefore, at step 1316, the single hub-and-spoke S=$\{(v_1 \rightarrow v_4, v_5)\}$, and now CH=$\{v_2, v_3, v_4, v_5, v_6, v_7, v_9, v_{10}\}$.

Figure 14:
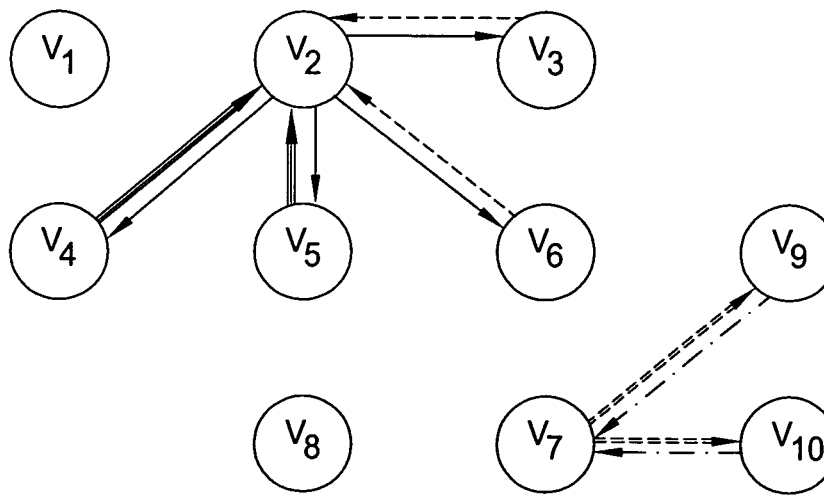
Figure 15:
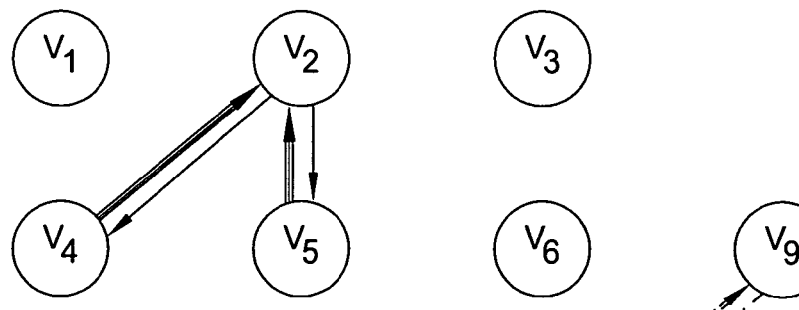

FIGS. 14-16 each depict the VRF-VRF table and associated schematic diagram of the nodes and associated links of the network after an exemplary iteration of the method of FIG. 13. Referring to FIG. 14, after the single hub-and-spoke S=$\{(v_1 \rightarrow v_4, v_5)\}$ has been determined, the $r_1$ entries in the cells associated with single hub-and-spoke S=$\{(v_1 \rightarrow v_4, v_5)\}$ are removed. Referring to the schematic diagram 1400 of the nodes and links in FIG. 14, it is noted that the links between single hub-and-spoke S=$\{(v_1 \rightarrow v_4, V_5)\}$ are also removed.

Since at step 1318, set CH is not empty, method 1300 is repeated a second time. Table 2 below discloses the results of steps 1302 through 1306 of this second iteration.

TABLE 2

| Spoke set | Elements | Export to hub | In-Degree |
|---|---|---|---|
| $S(v_2, r_1)$ | $\{v_3, v_4, v_5, v_6\}$ | $\{v_3, v_6\}$ to $v_2$ using $r_3$ and $\{v_4, v_5\}$ using $r_4$ | $\max\{\|\{v_3, v_6\}\|, \|\{v_4, v_5\}\|\} = 2$ |
| $S(v_3, r_3)$ | $\{v_2\}$ | $\{v_2\}$ to using $r_1$ | $\max\|\{v_2\}\| = 1$ |
| $S(v_4, r_4)$ | $\{v_2\}$ | $\{v_2\}$ to $v_4$ using $r_1$ | $\max\|\{v_2\}\| = 1$ |
| $S(v_5, r_4)$ | $\{v_2\}$ | $\{v_2\}$ to $v_5$ using $r_1$ | $\max\|\{v_2\}\| = 1$ |
| $S(v_6, r_3)$ | $\{v_2\}$ | $\{v_2\}$ to $v_6$ using $r_1$ | $\max\|\{v_2\}\| = 1$ |
| $S(v_7, r_5)$ | $\{v_9, v_{10}\}$ | $\{v_9, v_{10}\}$ to $v_7$ using $r_7$ | $\max\|\{v_9, v_{10}\}\| = 2$ |
| $S(v_9, r_7)$ | $\{v_7\}$ | $\{v_7\}$ to $v_9$ using $r_5$ | $\max\|\{v_7\}\| = 1$ |
| $S(v_{10}, r_7)$ | $\{v_7\}$ | $\{v_7\}$ to $v_{10}$ using $r_5$ | $\max\|\{v_7\}\| = 1$ |

Referring to FIG. 14, at step 1308, the hubs qualified for selection are $v_2, v_7$. At step 1312, single hub-and spoke component ($v_2 \rightarrow v_3, v_6$) is selected, since node $v_2$ also belongs to the preferred hub set $v_2 \in$ PH. Therefore, at step 1316, the single hub-and-spoke set is S=$\{(v_1 \rightarrow v_4, v_5), (v_2 \rightarrow v_3, v_6)\}$, and now the candidate hub set is CH=$\{v_2, v_4, v_5, v_7, v_9, v_{10}\}$.

Referring to FIG. 15, after the single hub-and-spoke S=$\{(v_2 \rightarrow v_3, v_6)\}$ has been determined, the $r_3$ entries in the cells associated with single hub-and-spoke S=$\{(v_2 \rightarrow v_3, v_6)\}$ are removed. Referring to the schematic diagram 1500 of the nodes and links in FIG. 15, it is noted that the links between single hub-and-spoke S=$\{(v_2 \rightarrow v_3, v_6)\}$ are also removed.

Since at step 1318, set CH is not empty, method 1300 is repeated a third time. Table 3 below discloses the results of steps 1302 through 1306 of this third iteration.

TABLE 3

| Spoke set | Elements | Export to hub | In-Degree |
|---|---|---|---|
| $S(v_2, r_1)$ | $\{v_4, v_5\}$ | $\{v_4, v_5\}$ using $r_4$ | $\max\|\{v_4, v_5\}\| = 2$ |
| $S(v_4, r_4)$ | $\{v_2\}$ | $\{v_2\}$ to $v_4$ using $r_1$ | $\max\|\{v_2\}\| = 1$ |
| $S(v_5, r_4)$ | $\{v_2\}$ | $\{v_2\}$ to $v_5$ using $r_1$ | $\max\|\{v_2\}\| = 1$ |
| $S(v_7, r_5)$ | $\{v_9, v_{10}\}$ | $\{v_9, v_{10}\}$ to $v_7$ using $r_7$ | $\max\|\{v_9, v_{10}\}\| = 2$ |
| $S(v_9, r_7)$ | $\{v_7\}$ | $\{v_7\}$ to $v_9$ using $r_5$ | $\max\|\{v_7\}\| = 1$ |
| $S(v_{10}, r_7)$ | $\{v_7\}$ | $\{v_7\}$ to $v_{10}$ using $r_5$ | $\max\|\{v_7\}\| = 1$ |

Referring to FIG. 15, at step 1308, the hubs qualified for selection are $v_2, v_7$. At step 1312, single hub-and spoke component ($v_2 \rightarrow v_4, v_5$) is selected, since node $v_2$ belongs to the preferred hub set $v_2 \in$ PH, as discussed above. Therefore, at step 1316, the single hub-and-spoke set is S=$\{(v_1 \rightarrow v_4, v_5), (v_2 \rightarrow v_3, v_6), (v_2 \, v_4, v_5)\}$, and now the candidate hub set is CH=$\{v_7, v_9, v_{10}\}$.

Referring to FIG. 16, after the single hub-and-spoke S=$\{(v_2 \rightarrow v_4, v_5)\}$ has been determined, the $r_4$ entries in the cells associated with single hub-and-spoke S=$\{(v_2 \rightarrow v_4, v_5)\}$ are removed. Referring to the schematic diagram 1600 of the nodes and links in FIG. 16, it is noted that the links between single hub-and-spoke S=$\{(v_2 \rightarrow v_4, v_5)\}$ are also removed.

Since at step 1318, set CH is still not empty, method 1300 is repeated a fourth time. Table 4 below discloses the results of steps 1302 through 1306 of this fourth iteration.

TABLE 4

| Spoke set | Elements | Export to hub | In-Degree |
|---|---|---|---|
| $S(v_7, r_5)$ | $\{v_9, v_{10}\}$ | $\{v_9, v_{10}\}$ to $v_7$ using $r_7$ | $\max\|\{v_9, v_{10}\}\| = 2$ |
| $S(v_9, r_7)$ | $\{v_7\}$ | $\{v_7\}$ to $v_9$ using $r_5$ | $\max\|\{v_7\}\| = 1$ |
| $S(v_{10}, r_7)$ | $\{v_7\}$ | $\{v_7\}$ to $v_{10}$ using $r_5$ | $\max\|\{v_7\}\| = 1$ |

Referring to FIG. 16, at step 1308, the hubs qualified for selection is $v_7$. At step 1312, single hub-and spoke component ($v_7 \rightarrow v_9, v_{10}$) is selected, since node $v_7$ is the only remaining node in the candidate hub set $v_7 \in$ P. Therefore, S=$\{(v_1 \rightarrow v_4, v_5), (v_2 \rightarrow v_3, v_6), (v_2 \, v_4, v_5), (v_7 \, v_9, v_{10})\}$, and now at step 1318, the candidate hub set is empty (CH={ }). Once the atomic single hub-and spoke components are determined by method 1300 (i.e., step 312 of FIG. 3), method 300 then proceeds to step 314.

Referring to method 300 of FIG. 3, at step 314, a set of molecular multi hub-and-spoke components are identified. One embodiment for determining molecular multi hub-and-spoke components is shown and discussed with respect to method 1700 of FIGS. 17A and 17B.

Figure 17A:
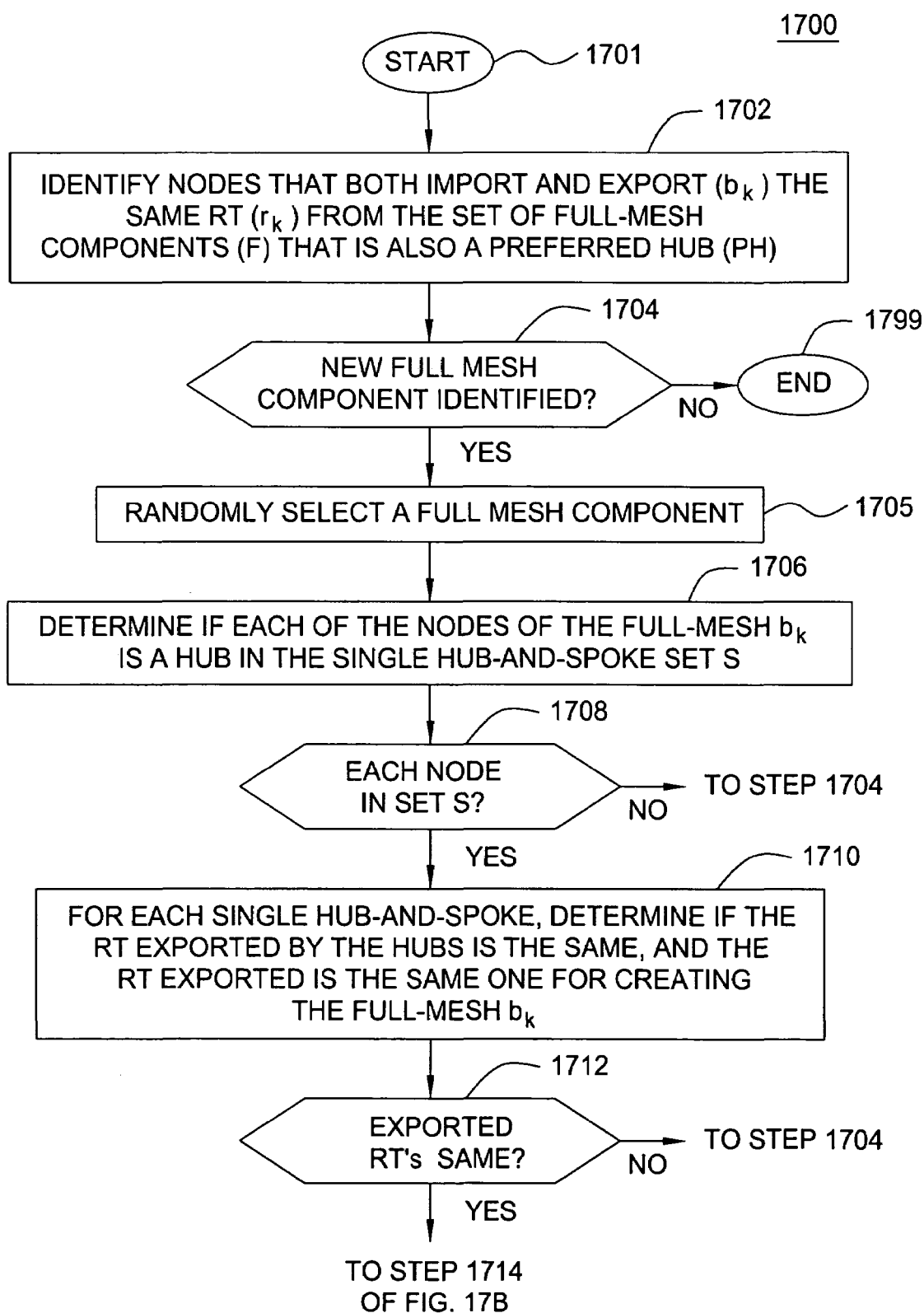
FIGS. 17A and 17B collectively depict a flow diagram of an exemplary method for determining a set of molecular multi hub-and-spoke components suitable for use in the method of FIG. 3.
Figure 17B:
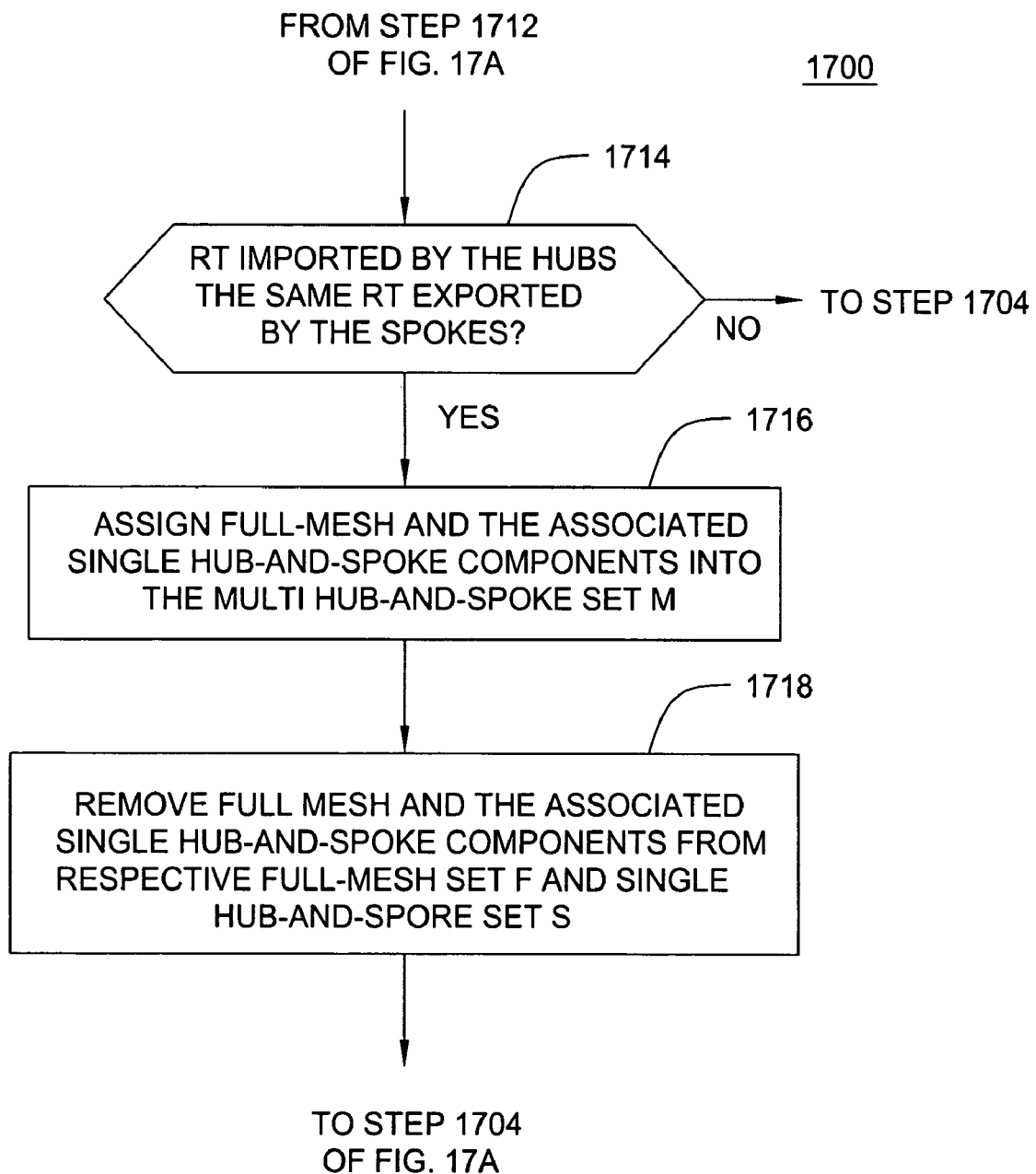

FIGS. 17A and 17B collectively depict a flow diagram of an exemplary method 1700 for determining a set of molecular multi hub-and-spoke components suitable for use in the method 300 of FIG. 3. Method 1700 is used to prepare the set "M," which represents the atomic multi hub-and-spoke set. Method 1700 starts at step 1701, and proceeds to step 1702, where from the set F, a new full-mesh component is taken, all whose nodes are members of PH, where $b_k \in F \wedge b_k \subseteq PH$, $1 \leq k \leq m$. That is, nodes are identified that import and export ($b_k$) the same RT ($r_k$) from the full-mesh component set F, as well as belong to the preferred hub set PH.

If at step 1704, such full-mesh components are not found, then the method 1700 ends at step 1799. Otherwise, the method 1700 proceeds to step 1705, where a full mesh component is randomly selected.

At step 1706, a determination is made whether each of the nodes of the full-mesh component $b_k$ is a hub in the single hub-and-spoke set S. If at step 1708, each node is not in set S, the method 1700 proceeds to step 1704. If other full mesh components remain in set F, then the method proceeds to step 1705, where another full mesh component is randomly selected. Otherwise, method 1700 ends at step 1799. If step 1708 is affirmatively answered, then method 1700 proceeds to step 1710.

At step 1710, for each atomic single hub-and-spoke (where the hub $\in b_k$), a determination is made whether the RT exported by the hubs to the spokes is the same, the RT exported is the same one used for creating full-mesh $b_k$, and the RT imported by the hubs from the spokes is the same. If at step 1712, the exported RTs are not the same, the method 1700 proceeds to step 1704, where either another full mesh component is selected (e.g., randomly) or the method 1700 ends, as discussed above. Otherwise, the method 1700 proceeds to step 1714 (FIG. 17B). If the determination at step 1712 is affirmatively answered, then method 1700 proceeds to step 1714.

At step 1714, a determination is made whether the RT imported by the hubs is the same RT exported by the spokes. If the determination at step 1714 is negatively answered, the method 1700 proceeds to step 1704, where either another full mesh component is selected (e.g., randomly), or the method 1700 ends. If the determination of step 1714 is affirmatively answered, the method proceeds to step 1716, where the full-mesh and the associated single hub-and-spoke components are assigned to the multi hub-and-spoke set {M}.

The method 1700 then proceeds to step 1718, where the full-mesh and the associated single hub-and-spoke components are removed from the respective full-mesh set {F} and the associated single hub-and-spoke set {S}. The method 1700 then proceeds to step 1704 and is repeated, until at step 1704, no new full mesh components are identified, and method 1700 ends at step 1799.

Method 1700, as applied to the exemplary network of FIGS. 4-16, shows that $(v_1, v_2) \in F$, and both $v_1$ and $v_2$ are hubs in S. That is, from the set $F=\{(v_1,v_2), (v_5,v_6,v_7,v_8)\}$, $v_1$ and $v_2$ belong to the preferred hub set PH (step 1702). At step 1706, single hub-and spoke components $(v_1 \rightarrow v_4, v_5)$ and $(v_2 \rightarrow v_4, v_5)$ are present in S. At step 1710, RT $r_4$ is exported by $v_4$ and $v_5$, and at step 1714, the RT is the same as the one imported by $v_1$ and $v_2$. Therefore, at steps 1716 and 1718, the set of atomic full-mesh components $F=\{v_5, v_6, v_7, v_8\}$, the set of atomic single hub-and-spoke components $S=\{(v_2 \rightarrow v_3, v_6), (v_7 \rightarrow v_9, v_{10})\}$, and the set of multi hub-and-spoke components $M=\{(v_1, v_2 \rightarrow v_4, v_5)\}$.

Figure 18:
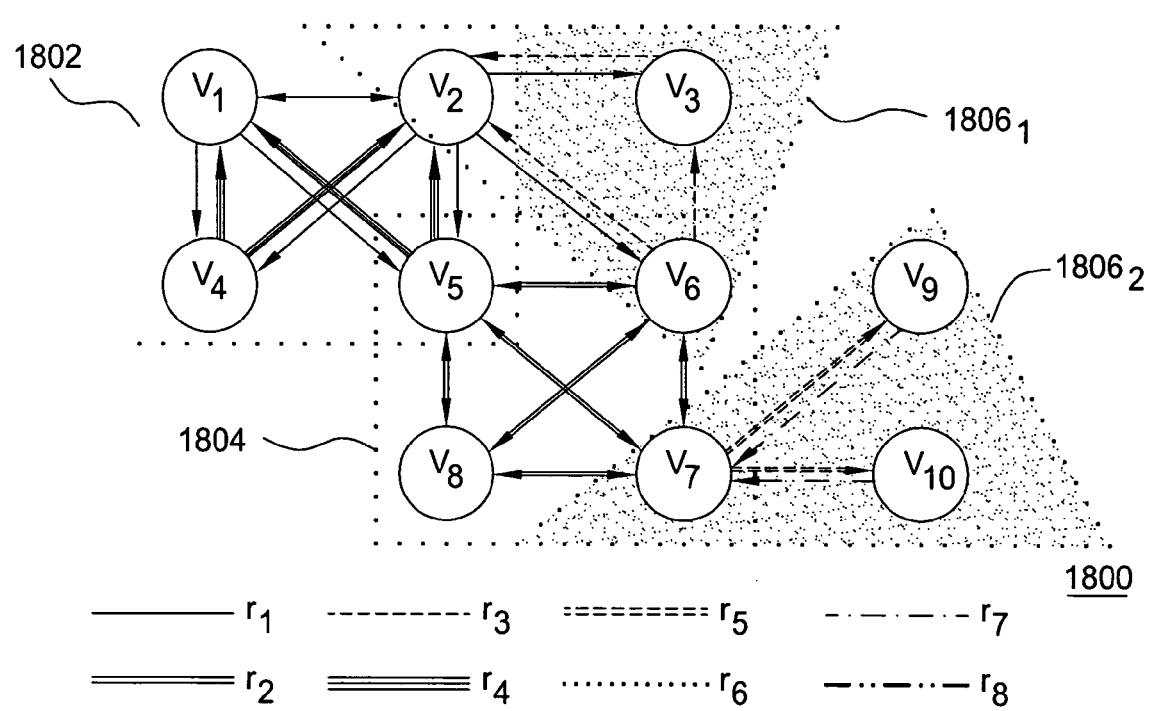
FIG. 18 depicts a schematic diagram of the nodes and associated links of the network in accordance with the method of FIG. 3.

FIG. 18 depicts a schematic diagram 1800 of the nodes and associated links of the network in accordance with the method of FIG. 3. Referring to FIG. 18, dotted line box 1802 surrounding nodes $v_1$, $v_2$, $v_4$, and $v_5$ represents molecular multi hub-and-spoke set M, dotted line box 1804 surrounding nodes $v_5$, $v_6$, $v_7$, and $v_8$ represents atomic full-mesh set F, and dotted line triangles 18061 and 18062 respectively represent the atomic single hub-and-spoke components $(v_2 \rightarrow v_3, v_6)$ and $(v_7 \rightarrow v_9, v_{10})$ of set S.

Referring to method 300 of FIG. 3, at step 316, a set of composite full mesh components, single hub-and-spoke components, and multi hub-and-spoke components are identified. Specifically, at step 316, a determination is made whether the complex VPN is a composite full-mesh. That is, every node is directly reachable from every other node. The first embodiment of step 316 is performed by verifying, from the VRF-VRF table 600, if each entry in the upper triangular matrix 610 without the diagonal 608 has a corresponding RT entry in the lower triangular matrix 612 formed below the diagonal of the VRF-VRF table. It is noted that the RTs in the mirror (lower triangular matrix) entries do not have to be the same.

Referring to the exemplary VRF-VRF table 600 of FIG. 6, all of entries in the upper triangular matrix 610 do not have a valid RT entry. For example, there are no RT values entered for nodes $v_7$-$v_{10}$. Therefore, a composite full-mesh topology does not exist for the example provided herein with respect to FIGS. 4-18. Rather, FIG. 18 illustrates a complex VPN, as will be discussed in further detail below.

At step 318, the topology of the complex VPNs in the network are determined. If at step 316, each entry in the upper triangular matrix without the diagonal has a valid RT entry in it, then at step 318 the topology of the complex VPN is a composite full-mesh topology, and at step 320, method 300 ends. Otherwise, step 316 is repeated to determine whether the complex VPN is a composite single hub-and-spoke.

The determination of whether the complex VPN is a composite single hub-and-spoke is made by initially ensuring that sets F and M are empty. If both sets F and M are empty, then a determination is made whether all the single hub-and-spoke components in S have the same hub. If at step 316 sets F and M are empty, and all the single hub-and-spoke components in S have the same hub, then at step 318, the topology of the complex VPN is a composite single hub-and-spoke, and at step 320, method 300 ends. Otherwise, step 316 is repeated again to determine whether the complex VPN is a composite multi hub-and-spoke. In the current example, sets F and M are not empty, and all the single hub-and-spoke components in S do not have the same hub. Therefore, a composite single hub-and-spoke topology does not exist for the example provided herein with respect to FIGS. 4-18.

In this third reiteration of step 316, a composite full mesh component that is the largest in size is identified from the VRF-VRF table. Then, from the set of atomic hub and spokes, all the composite single hub-and-spoke components are identified. From all the composite hub-and-spoke components, verification is made that all the hubs belong to the composite full mesh component, and all spokes in a spoke set of each composite single hub-and-spoke set are identical.

Specifically, the largest full-mesh component in the graph is determined. This is performed by finding the largest square sub-matrix with the same set of nodes in the rows and columns from the adjacency matrix, such that each entry of the sub-matrix has a valid RT in it, except for the diagonal of the sub-matrix which may or may not have any entry. The set formed is a composite full-mesh set, which is composed of the nodes of the sub-matrix, and denoted {CF}.

Next, from the set S, combine two single hub-and-spokes into one single hub-and-spoke if they both have the same hub. This combining step is continued until no more combinations are possible. The set formed is called the composite single hub-and-spoke, which is denoted {CS}.

Thereafter, a determination is made whether the set of hubs formed from CS is the same as the set CF. If so, a determination is made whether each single hub-and-spoke component of CS has the same set of spokes. If so, a determination is made whether CS contains all the nodes of the network. If at step 316, CS is the same as the set CF, each single hub-and-spoke component of CS has the same set of spokes, and CS contains all the nodes of the network, then at step 318, the topology of the complex VPN is a composite multi hub-and-spoke topology, and at step 320, method 300 ends. Referring to FIG. 18, it is clear that the exemplary VPN is not a composite multi hub-and-spoke topology, since CS is not the same as CF, each single hub-and-spoke component of CS does not have the same set of spokes, and CS does not contain all the nodes of the network.

It is noted that the determination of whether the complex VPN is a composite full-mesh, a composite single hub-and-spoke, or a composite multi-hub-and-spoke of step 316 of FIG. 3 may be performed in any order. If at step 316, the complex VPN of the network is not a composite full-mesh topology, a composite single hub-and-spoke topology, or a composite multi-hub-and-spoke topology, the method 300 proceeds to step 318.

At step 318, the topology of the complex VPNs in the network are determined. Recall that a complex VPN has been defined as a union of composite components. In the example provided in FIGS. 4-18, the topology of the network is not a composite full-mesh topology, a composite single hub-and-spoke topology, or a composite multi-hub-and-spoke topology. Rather, at step 318, the topology of the VPN (as illustratively shown in FIG. 18) is a complex VPN, which includes the union of a full-mesh component (nodes $v_5$, $v_6$, $v_7$, $v_8$), two single-hub-and-spoke components ($v_2 \rightarrow v_3$, $v_6$) and ($v_7 \rightarrow v_9$, $v_{10}$), and a multi-hub-and-spoke component ($v_1$, $v_2 \rightarrow v_4$, $v_5$). That is, the VPN of FIG. 18 includes a molecular full-mesh component 1802, an atomic full-mesh component 1804, and two atomic single hub-and-spoke components. Once the topology of the complex VPNs has been determined, the method 300 proceeds to step 320, where the method 300 ends.

It is noted that the present invention may be implemented and operated in an environment comprising software, hardware, or combination thereof in any conventional computer device having a processor, memory, support circuitry, as well I/O circuitry and devices capable of executing the methods of the present invention. The implementation of such computer device may be provided centrally or be distributed across multiple computer devices in a service provider network. Thus, the present invention enables a service provider to accurately determine the current VPN topology in its network by identifying all the atomic components, the molecular components, composite components, and complex components that may exist in a VPN network. Thus, by examining the actual connectivity graph, the present invention provides a more accurate and complete solution for identifying network components than prior art pattern matching based solutions. Further, a person skilled in the art will appreciate that there are several advantages of being able to accurately discover (determine) the VPNs in the network of a service provider. Such advantages include, but are not limited to, populating a database when the present invention is installed in a network for the first time, finding discrepancies between provisioning a database and the actual network, visualizing the topology of the VPNs, among other advantages.

Although various embodiments that incorporate the teachings of the present invention have been shown and described in detail herein, those skilled in the art may readily devise many other varied embodiments that still incorporate these teachings.

What is claimed is:

1. A method of identifying virtual private networks (VPNs) in a network of a service provider, comprising:
    generating a VPN routing forwarding—route target (VRF-RT) table for said network;
    generating at least one of a VRF-VRF table and a VRF connectivity graph from said VRF-RT table;
    determining, from said VRF-RT table, a set of atomic full-mesh components; and
    determining, from said at least one of a VRF-VRF table and a VRF connectivity graph, at least one set of other types of VPN components.

2. The method of claim 1, wherein said other types of VPN components comprise at least one of atomic single hub-and-spoke components, molecular multi-hub-and-spoke components, composite full-mesh components, composite single hub-and-spoke components, and composite multi hub-and-spoke components.

3. The method of claim 2, wherein an atomic full-mesh component is a full-mesh topology having one route target (RT), an atomic single hub-and-spoke component is a largest single hub-and-spoke topology having two RTs, and a molecular multi-hub-and-spoke component is a largest multi-hub-and-spoke topology having two RTs without restriction of overlapping links and nodes with atomic components.

4. The method of claim 1, wherein said generating said VRF-RT table comprises:
    identifying n-VRF tables associated wit a plurality of nodes in the network;
    identifying m-RTs in said network, where m and n are integers greater tan 1; and
    determining unidirectional and bi-directional communications between said nodes based on said VRF tables and RTs.

5. The method of claim 1, wherein said generating at least one of a VRF-VRF table and a VRF connectivity graph comprises:
    identifying export and import RT values associated with each of said nodes in said network; and
    identifying in-degree and out-degree links therebetween said nodes.

6. The method of claim 5, further comprising removing unidirectional links from said graph.

7. The method of claim 5, further comprising reducing redundant RTs from said VRF-VRF table.

8. The method of claim 2, wherein determining each atomic full-mesh component of a set of atomic full-mesh components comprises:
    identifying at least two nodes associated with a selected RT of said VRF-RT table that both export and import said selected RT.

9. The method of claim 8, further comprising:
    removing at least one of table entries and links associated with said set of atomic full-mesh components respectively from said at least one of a VRF-VRF table and a VRF connectivity graph.

10. The method of claim 2, wherein determining each atomic single hub-and spoke component of a set of atomic singic hub-and-spoke components comprises:
   determining a set of candidate hubs from said graph;
   determining all distinct RTs used to export from each candidate hub;
   identifying a set of spokes for each distinct RT;
   determining, for each set of spokes, a largest subset of nodes that use a common RT to export to the hub;
   determining a hub from the set of candidate hubs having a largest in-degree value; and
   selecting one of said hubs from said set of candidate hubs.

11. The method of claim 10, wherein said selecting one of said hubs from said set of candidate hubs comprises selecting a candidate hub from a set of preferred hubs in an instance where multiple hubs in the set of candidate hubs qualify.

12. The method of claim 11, further comprising:
   generating said set of preferred hubs from said set of candidate hubs, where an RT used for determining an atomic full-mesh component is also associated with at least one node that imports that RT.

13. The method of claim 11, wherein said selecting a candidate hub from a set of preferred hubs comprises randomly selecting one of said preferred hubs in an instance where there are multiple preferred hubs.

14. The method of claim 11, wherein said selecting one of said hubs from said set of candidate hubs comprises randomly selecting one of said hubs in an instance where said set of preferred hubs is empty.

15. The method of claim 10, further comprising:
   removing at least one of table entries and links associated with the set of single hub-and-spoke components respectively from said at least one of a VRF-VRF table and a VRF connectivity graph, and
   removing singleton nodes from said set of candidate hubs.

16. The method of claim 2, wherein determining a molecular multi hub-and-spoke component from a set of molecular multi hub-and-spoke components comprises;
   identifying a new full-mesh component from said set of atomic full-mesh components, wherein node members of said new full-mesh component are associated with a preferred hub of said set of preferred hubs;
   selecting a full-mesh component;
   determining if each of said nodes in the full-mesh component is a hub in the single hub-and-spoke set; and
   determining, for each atomic single hub-and spoke, whether an RT exported by a hub to its spokes is identical, the RT exported is used for creating said full-mesh component, and an RT imported by the hub from all its spokes is identical.

17. The method of claim 16, further comprising:
   assigning identified full-mesh and associated single hub-and-spoke components to a set of multi hub-and spoke components; and
   removing said identified full-mesh and associated single hub-and-spoke components respectively from a set full-mesh components and a set of single hub-and spoke components.

18. The method of claim 2, further comprising:
   determining whether a complex VPN is a composite full-mesh component.

19. The method of claim 18, wherein said determining whether a complex VPN is a composite full-mesh component comprises:
   determining, from said VRF-VRF table, whether each entry in an upper triangular matrix formed above a diagonal of said VRF-VRF table has a corresponding RT entry in a lower triangular matrix formed below said diagonal of said VRF-VRF table.

20. The method of claim 2, further comprising:
   determining whether a complex VPN is a composite single hub-and-spoke component.

21. The method of claim 20, wherein said determining whether a complex VPN is a composite single hub-and-spoke component comprises:
   determining that a set of all atomic full-mesh components is empty; and
   defining said VPN network as a composite single hub-and-spoke topology in an instance where all single hub-and-spoke components in the set of atomic single hub-and-spoke spoke components have a common hub.

22. The method of claim 2, further comprising:
   determining whether a complex VPN is a composite multi hub-and-spoke component.

23. The method of claim 22, wherein said determining whether a complex VPN is a composite multi hub-and-spoke component comprises:
   identifying, from the VRF-VRF table, a composite full mesh component being largest in size;
   identifying, from a set of all atomic hub and spokes, all the composite single hub-and-spoke components;
   identifying, from all the composite hub-and-spoke components, that all the hubs belong to the composite full mesh component, and a spoke set of each composite single hub-and-spoke set are identical.

24. Apparatus for identifying virtual private networks (VPNs) in a network of a service provider, comprising:
   means for generating a VPN routing forwarding—route target (VRF-RT) table for said network;
   means far generating at least one of a VRF-VRF table and a VRF connectivity graph from said VRF-RT table;
   means for determining, from said VRF-RT table, a set of atomic full-mesh components; and
   means for determining, from said at least one of a VRF-VRF table and a VRF connectivity graph, at least one set of other types of VPN components.

25. The apparatus of claim 24, wherein said other types of VPN components comprise at least one of atomic single hub-and-spoke components, molecular multi-hub-and-spoke components, composite full-mesh components, composite single hub-and-spoke components, and composite multi hub-and-spoke components.

26. The apparatus of claim 25, wherein an atomic full-mesh component is a full-mesh topology having one route target (RT), an atomic single hub-and-spoke component is a largest single hub-and-spoke topology having two RTs, and a molecular multi-hub-and-spoke component is a largest multi-hub-and-spoke topology having two RTs without restriction of overlapping links and nodes with atomic components.

27. The apparatus of claim 25, wherein determining each atomic full-mesh component of a set of atomic full-mesh components comprises:
   means for identifying at least two nodes associated with a selected RT of said VRF-RT table that both export and import said selected RT.

28. The apparatus of claim 25, wherein determining each atomic single hub-and spoke component of said set of atomic single hub-and-spoke components comprises:
   means for determining a set of candidate hubs from said graph;
   means for determining all distinct RTs used to export from each candidate hub;
   means for identifying a set of spokes for each distinct RT;

means for determining, for each set of spokes, a largest subset of nodes that use a common RT to export to the hub;

means for determining a hub from the set of candidate hubs having a largest in-degree value; and means for selecting one of said hubs from said set of candidate hubs.

29. The apparatus of claim 25, wherein determining a molecular multi hub-and-spoke component from a set of molecular multi hub-and-spoke components comprises:

means for identifying a new full-mesh component from said set of atomic full-mesh components, wherein node members of said new full-mesh component are associated with a preferred hub of said set of preferred hubs;

means for selecting a full-mesh component;

means for determining if each of said nodes in the full-mesh component is a hub in the single hub-and-spoke set; and means for determining, for each atomic single hub-and-spoke, whether an RT exported by a hub to its spokes is identical, the RT exported is used for creating said full-mesh component, and an RT imported by the hub from all its spokes is identical.

30. The apparatus of claim 25, further comprising:

means for determining whether a complex VPN is one of a composite full-mesh component, a composite single hub-and-spoke component, and a composite multi hub-and-spoke component.

* * * * *